US010860990B2

(12) United States Patent
Bowles et al.

(10) Patent No.: US 10,860,990 B2
(45) Date of Patent: Dec. 8, 2020

(54) METHODS AND SYSTEMS FOR EVALUATING AND RECYCLING ELECTRONIC DEVICES

(71) Applicant: ecoATM, LLC, San Diego, CA (US)

(72) Inventors: Mark Vincent Bowles, San Diego, CA (US); Randal Erman, San Diego, CA (US); John Andrew Beane, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 1069 days.

(21) Appl. No.: 14/934,134

(22) Filed: Nov. 5, 2015

(65) Prior Publication Data

US 2016/0132840 A1 May 12, 2016

Related U.S. Application Data

(60) Provisional application No. 62/076,437, filed on Nov. 6, 2014.

(51) Int. Cl.
  *G06Q 30/02* (2012.01)
  *G06Q 10/00* (2012.01)
  (Continued)

(52) U.S. Cl.
  CPC ......... *G06Q 10/30* (2013.01); *G06Q 30/0278* (2013.01); *H04M 1/0287* (2013.01);
  (Continued)

(58) Field of Classification Search
  CPC .................................................. G06Q 10/30
  See application file for complete search history.

(56) References Cited

U.S. PATENT DOCUMENTS 3,808,439 A 4/1974 Renius
4,248,334 A 2/1981 Hanley et al.
(Continued)

FOREIGN PATENT DOCUMENTS

CA 2818533 A1 5/2012
CN 1365479 A1 8/2002
(Continued)

OTHER PUBLICATIONS

Wiley Encyclopedia of Computer Science and Technology (Year: 2009).*

(Continued)

*Primary Examiner* — Arthur Duran
*Assistant Examiner* — Breffni Baggot
(74) *Attorney, Agent, or Firm* — Perkins Coie LLP

(57) ABSTRACT

Hardware and software application systems and associated methods for obtaining information from, evaluating, and pricing mobile phones, tablet computers, laptop computers, and/or other electronic devices for recycling and/or other processing are described herein. In various embodiments, the present technology includes systems and methods associated with an electronic evaluator device that facilitates processing (e.g., purchasing at a consumer-operated kiosk) a target device. In some embodiments, the present technology includes using an app on the evaluator device to obtain information from the target device, identify the target device, evaluate the target device, price the target device, etc. Various other aspects of the present technology are described herein.

43 Claims, 14 Drawing Sheets

(51) Int. Cl.
*H04M 1/02* (2006.01)
*H04W 8/22* (2009.01)
(52) U.S. Cl.
CPC .............. *H04W 8/22* (2013.01); *Y02W 30/82* (2015.05); *Y02W 90/00* (2015.05)

(56) References Cited

U.S. PATENT DOCUMENTS

| | | |
|---|---|---|
| 4,519,522 A | 5/1985 | McElwee |
| 4,715,709 A | 12/1987 | Sekine et al. |
| 4,821,118 A | 4/1989 | Lafreniere |
| 4,870,357 A | 9/1989 | Young et al. |
| 4,878,736 A | 11/1989 | Hekker et al. |
| 4,927,051 A | 5/1990 | Falk et al. |
| 4,951,308 A | 8/1990 | Bishop et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,419,438 A | 5/1995 | Squyres et al. |
| 5,436,554 A | 7/1995 | Decker |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,775,806 A | 7/1998 | Allred |
| 5,839,058 A | 11/1998 | Phillips et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,181,805 B1 | 1/2001 | Koike et al. |
| 6,228,008 B1 | 5/2001 | Pollington et al. |
| 6,259,827 B1 | 7/2001 | Nichani |
| 6,264,104 B1 | 7/2001 | Jenkins et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,633,377 B1 | 10/2003 | Weiss et al. |
| 6,667,800 B1 | 12/2003 | Larsson et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 7,069,236 B1 | 6/2006 | Tsunenari |
| 7,076,449 B2 | 7/2006 | Tsunenari et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,520,666 B2 | 4/2009 | Pevzner et al. |
| 7,529,687 B1 | 5/2009 | Phan |
| 7,567,344 B2 | 7/2009 | LeBlanc et al. |
| 7,646,193 B2 | 1/2010 | Suzuki et al. |
| 7,649,450 B2 | 1/2010 | Campion, Jr. et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,881,965 B2 * | 2/2011 | Bowles ............... G06Q 10/30 705/14.37 |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,195,511 B2 | 6/2012 | Bowles et al. |
| 8,200,533 B2 | 6/2012 | Librizzi et al. |
| 8,254,883 B2 | 8/2012 | Uchida |
| 8,266,008 B1 | 9/2012 | Siegel et al. |
| 8,423,404 B2 | 4/2013 | Bowles et al. |
| 8,429,021 B2 | 4/2013 | Kraft et al. |
| 8,463,646 B2 | 6/2013 | Bowles et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,743,215 B1 | 6/2014 | Lee |
| 8,824,136 B1 | 9/2014 | Interian, III et al. |
| 9,010,627 B1 | 4/2015 | Prasad et al. |
| 9,043,026 B2 | 5/2015 | Lien et al. |
| 9,195,979 B2 | 11/2015 | Geller |
| 9,317,989 B2 | 4/2016 | Grow et al. |
| 9,582,101 B2 | 2/2017 | Chang et al. |
| 9,595,238 B2 | 3/2017 | Won |
| 9,818,160 B2 | 11/2017 | Bowles et al. |
| 9,881,284 B2 | 1/2018 | Bowles et al. |
| 9,911,102 B2 | 3/2018 | Bowles |
| 10,032,140 B2 | 7/2018 | Bowles et al. |
| 10,055,798 B2 | 8/2018 | Bowles et al. |
| 10,127,647 B2 | 11/2018 | Foruntanpour et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis et al. |
| 2003/0036866 A1 | 2/2003 | Nair et al. |
| 2003/0061150 A1 | 3/2003 | Kocher |
| 2003/0146898 A1 | 8/2003 | Kawasaki et al. |
| 2003/0170529 A1 | 9/2003 | Sagawa |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Berger et al. |
| 2004/0186744 A1 | 9/2004 | Lux |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0109841 A1 * | 5/2005 | Ryan ................... G06F 13/385 235/380 |
| 2005/0128551 A1 | 6/2005 | Yang |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0047573 A1 * | 3/2006 | Mitchell ............... G06Q 30/02 705/14.14 |

(56) References Cited

U.S. PATENT DOCUMENTS

| | | |
|---|---|---|
| 2006/0074756 A1* | 4/2006 | Boykin, III ............ G06Q 30/02 705/14.24 |
| 2006/0167580 A1 | 7/2006 | Whittier |
| 2006/0184379 A1 | 8/2006 | Tan et al. |
| 2006/0195384 A1 | 8/2006 | Bauer et al. |
| 2006/0217152 A1 | 9/2006 | Fok et al. |
| 2006/0219776 A1* | 10/2006 | Finn ........................ B60R 25/25 235/380 |
| 2006/0229108 A1 | 10/2006 | Cehelnik |
| 2006/0235747 A1 | 10/2006 | Hammond et al. |
| 2006/0261931 A1 | 11/2006 | Cheng |
| 2006/0271431 A1 | 11/2006 | Wehr et al. |
| 2006/0279307 A1 | 12/2006 | Wang et al. |
| 2006/0280356 A1 | 12/2006 | Yamagishi |
| 2007/0013124 A1 | 1/2007 | Graef et al. |
| 2007/0032098 A1* | 2/2007 | Bowles ................. H01M 10/46 439/11 |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0140310 A1 | 6/2007 | Rolton et al. |
| 2007/0150403 A1 | 6/2007 | Mock et al. |
| 2007/0205751 A1 | 9/2007 | Suzuki et al. |
| 2007/0263099 A1 | 11/2007 | Motta et al. |
| 2007/0269099 A1 | 11/2007 | Nishino et al. |
| 2007/0281734 A1 | 12/2007 | Mizrachi |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0097770 A1 | 4/2008 | Low et al. |
| 2008/0109746 A1 | 5/2008 | Mayer |
| 2008/0111989 A1 | 5/2008 | Dufour et al. |
| 2008/0133432 A1* | 6/2008 | Ramseyer ............. G06Q 10/02 705/400 |
| 2008/0149720 A1 | 6/2008 | Colville |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0095047 A1 | 4/2009 | Patel et al. |
| 2009/0160668 A1 | 6/2009 | Crowley et al. |
| 2009/0184865 A1 | 7/2009 | Valo et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2010/0005004 A1 | 1/2010 | Hudak et al. |
| 2010/0063894 A1 | 3/2010 | Lundy |
| 2010/0088192 A1* | 4/2010 | Bowles ................. G06Q 10/30 705/26.1 |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1* | 6/2010 | Casey ................. H04L 41/5035 726/3 |
| 2010/0169231 A1 | 7/2010 | Librizzi et al. |
| 2010/0185506 A1 | 7/2010 | Wolff |
| 2010/0219234 A1 | 9/2010 | Forbes |
| 2010/0228676 A1* | 9/2010 | Librizzi ................. G06Q 10/00 705/306 |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0035322 A1 | 2/2011 | Lively |
| 2011/0043628 A1 | 2/2011 | Yun |
| 2011/0060641 A1 | 3/2011 | Grossman et al. |
| 2011/0067520 A1 | 3/2011 | Ihrke et al. |
| 2011/0113479 A1* | 5/2011 | Ganem ................. G06F 21/34 726/9 |
| 2011/0235853 A1 | 9/2011 | Bowles et al. |
| 2011/0313840 A1 | 12/2011 | Mason et al. |
| 2012/0016518 A1 | 1/2012 | Saario et al. |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0054113 A1 | 3/2012 | Jayaraman et al. |
| 2012/0063501 A1 | 3/2012 | Aguren |
| 2012/0078413 A1 | 3/2012 | Baker, Jr. |
| 2012/0116628 A1 | 5/2012 | Gventer et al. |
| 2012/0116929 A1 | 5/2012 | Gventer et al. |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0191562 A1 | 7/2012 | Bowles et al. |
| 2012/0235812 A1 | 9/2012 | De Mello et al. |
| 2012/0254046 A1 | 10/2012 | Librizzi et al. |
| 2012/0303431 A1* | 11/2012 | Phillips ................. G06Q 30/02 705/14.22 |
| 2013/0006713 A1 | 1/2013 | Haake |
| 2013/0034305 A1 | 2/2013 | Jahanshahi et al. |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0144797 A1 | 6/2013 | Bowles et al. |
| 2013/0155061 A1 | 6/2013 | Jahanshahi et al. |
| 2013/0173434 A1 | 7/2013 | Hartman |
| 2013/0181935 A1 | 7/2013 | Mckenzie et al. |
| 2013/0191236 A1 | 7/2013 | Bowles |
| 2013/0198089 A1 | 8/2013 | Bowles |
| 2013/0198144 A1 | 8/2013 | Bowles |
| 2013/0226679 A1 | 8/2013 | Bowles |
| 2013/0246211 A1* | 9/2013 | Sullivan ................. H04W 4/12 705/26.4 |
| 2013/0246212 A1* | 9/2013 | Sullivan ............. G06Q 30/0611 705/26.4 |
| 2013/0253700 A1 | 9/2013 | Carson et al. |
| 2013/0275314 A1 | 10/2013 | Bowles |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0012643 A1 | 1/2014 | Behrisch |
| 2014/0038556 A1 | 2/2014 | De Sousa |
| 2014/0052329 A1 | 2/2014 | Amirpour |
| 2014/0067710 A1 | 3/2014 | Gventer et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Chen et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1* | 3/2015 | Ackerman ......... G06Q 10/0836 705/39 |
| 2015/0120485 A1 | 4/2015 | Nash |
| 2015/0193797 A1 | 7/2015 | Gerrity |
| 2015/0206200 A1 | 7/2015 | Edmondson et al. |
| 2015/0278529 A1 | 10/2015 | Cho |
| 2015/0332206 A1* | 11/2015 | Trew ................. G06Q 10/0836 705/330 |
| 2015/0356637 A1 | 12/2015 | Graffia et al. |

(56) References Cited

U.S. PATENT DOCUMENTS

| | | | |
|---|---|---|---|
| 2016/0019607 A1* | 1/2016 | Burmester | H04W 4/80 705/306 |
| 2016/0019685 A1 | 1/2016 | Nguyen | |
| 2016/0055392 A1 | 2/2016 | Nakano | |
| 2016/0091549 A1 | 3/2016 | Snook et al. | |
| 2016/0092849 A1 | 3/2016 | Cirannek et al. | |
| 2016/0098688 A1 | 4/2016 | Hunt et al. | |
| 2016/0098689 A1 | 4/2016 | Bowles et al. | |
| 2016/0098690 A1 | 4/2016 | Silva et al. | |
| 2016/0125367 A1 | 5/2016 | Bowles et al. | |
| 2016/0125548 A1 | 5/2016 | Bowles et al. | |
| 2016/0125612 A1 | 5/2016 | Seki et al. | |
| 2016/0132840 A1 | 5/2016 | Bowles et al. | |
| 2016/0171456 A1 | 6/2016 | Bowles | |
| 2016/0171544 A1 | 6/2016 | Heminger et al. | |
| 2016/0171575 A1 | 6/2016 | Bowles et al. | |
| 2016/0210648 A1 | 7/2016 | Cirannek | |
| 2016/0269401 A1 | 9/2016 | Saito et al. | |
| 2016/0275460 A1 | 9/2016 | Ploetner et al. | |
| 2016/0275518 A1 | 9/2016 | Bowles et al. | |
| 2016/0379287 A1 | 12/2016 | Dabiri et al. | |
| 2017/0083886 A1 | 3/2017 | Silva et al. | |
| 2017/0091823 A1 | 3/2017 | Adinarayan et al. | |
| 2017/0169401 A1 | 6/2017 | Beane et al. | |
| 2017/0278191 A1 | 9/2017 | Tassone et al. | |

FOREIGN PATENT DOCUMENTS

| | | |
|---|---|---|
| CN | 2708415 A1 | 7/2005 |
| CN | 1864088 A1 | 11/2006 |
| CN | 1957320 A1 | 5/2007 |
| CN | 200965706 A1 | 10/2007 |
| CN | 102246384 A1 | 11/2011 |
| CN | 202351953 A1 | 7/2012 |
| CN | 202394296 A1 | 8/2012 |
| CN | 102654927 A1 | 9/2012 |
| CN | 102812500 A1 | 12/2012 |
| CN | 102930642 A1 | 2/2013 |
| CN | 102976004 A1 | 3/2013 |
| CN | 103198562 A1 | 7/2013 |
| CN | 103226870 A1 | 7/2013 |
| CN | 203242065 A1 | 10/2013 |
| CN | 103440607 A1 | 12/2013 |
| CN | 103544772 A1 | 1/2014 |
| CN | 203408902 A1 | 1/2014 |
| CN | 103662541 A1 | 3/2014 |
| CN | 103679147 A1 | 3/2014 |
| CN | 203520502 A1 | 4/2014 |
| CN | 203588366 A1 | 5/2014 |
| CN | 103954626 | 7/2014 |
| CN | 105513201 A1 | 4/2016 |
| EP | 1168253 A1 | 1/2002 |
| EP | 1703436 A1 | 9/2006 |
| GB | 2167553 | 5/1986 |
| JP | 7112801 A1 | 5/1995 |
| JP | 7334583 A1 | 12/1995 |
| JP | 2000121564 A2 | 4/2000 |
| JP | 3123095 | 1/2001 |
| JP | 2002019147 A1 | 1/2002 |
| JP | 2002183286 A1 | 6/2002 |
| JP | 2002259528 A1 | 9/2002 |
| JP | 2002302252 A1 | 10/2002 |
| JP | 2002324264 A1 | 11/2002 |
| JP | 2002358354 A1 | 12/2002 |
| JP | 2003139516 A1 | 5/2003 |
| JP | 2003242243 A1 | 8/2003 |
| JP | 2003264007 A1 | 9/2003 |
| JP | 2003267509 A1 | 9/2003 |
| JP | 2004021569 A1 | 1/2004 |
| JP | 2004288143 A1 | 10/2004 |
| JP | 2004303102 A1 | 10/2004 |
| JP | 2004341681 A1 | 12/2004 |
| JP | 2006127308 A1 | 5/2006 |
| JP | 2006195814 A1 | 7/2006 |
| JP | 2006227764 A1 | 8/2006 |
| JP | 2006260246 A1 | 9/2006 |
| JP | 2007141266 A1 | 6/2007 |
| JP | 2007179516 A1 | 7/2007 |
| JP | 2007265340 A1 | 10/2007 |
| JP | 2008522299 A1 | 6/2008 |
| JP | 2008293391 A1 | 12/2008 |
| JP | 2007086725 A1 | 4/2009 |
| JP | 2009245058 A1 | 10/2009 |
| JP | 2009250971 A1 | 10/2009 |
| JP | 2010177720 A1 | 8/2010 |
| JP | 2012058932 A1 | 3/2012 |
| JP | 2013033361 A1 | 2/2013 |
| JP | 2013037441 A1 | 2/2013 |
| JP | 2013531823 A1 | 8/2013 |
| KR | 20000064168 A1 | 11/2000 |
| KR | 20130085255 A1 | 7/2013 |
| KR | 20140037543 A1 | 3/2014 |
| WO | 115096 A1 | 3/2001 |
| WO | 205176 A1 | 1/2002 |
| WO | WO-225613 | 3/2002 |
| WO | 239357 A1 | 5/2002 |
| WO | 3012717 A1 | 2/2003 |
| WO | 3014994 A1 | 2/2003 |
| WO | 2004021114 A1 | 3/2004 |
| WO | 2004114490 A1 | 12/2004 |
| WO | 2005008566 A1 | 1/2005 |
| WO | 2005101346 A1 | 10/2005 |
| WO | 2006058601 A1 | 6/2006 |
| WO | 2006080851 A1 | 8/2006 |
| WO | WO-2007066166 | 6/2007 |
| WO | 9128176 A1 | 10/2009 |
| WO | 2009128173 A1 | 10/2009 |
| WO | 2009129526 A1 | 10/2009 |
| WO | 2010040116 A1 | 8/2010 |
| WO | 2010128267 A1 | 11/2010 |
| WO | 2010128315 A1 | 11/2010 |
| WO | 2011131016 A1 | 10/2011 |
| WO | 2012138679 A1 | 10/2012 |
| WO | 2013074819 A1 | 5/2013 |
| WO | WO-2013/063042 A1 | 5/2013 |
| WO | WO-2014075055 | 5/2014 |
| WO | 2015022409 A1 | 2/2015 |

OTHER PUBLICATIONS

2006 Florida Statutes Title XXXIII, Chapter 538, Sections 538.03 and 538.04, 7 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bussiness Wire, "The World's First Office Photography Machine" at CES 2008 Launched by Ortery Technologies, Jan. 7, 2008, 3 pages.

CNET, "Tackling LCD "burn ins", and dead/stick Pixels", published Sep. 2, 2009, retrieved from http://www.cnet.com/news/tackling-lcd-burn-ins-and-deadstuck-pixels/.

Evgenii Masunov, Mar. 25, 2010, http://www.appleinsider.ru/news/ipone-obladaet-luchshim-tachskrinom-provereno_robotom.html, 4 pages.

Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.

GSM Arena Glossary, "LCD (Liquid Crystal Display", retrieved from http://www.gsmarena.com/glossary.php3?term=lcd on Apr. 28, 2016, 1 page.

Lambert, Emily, "Use It Up, Wear It Out", Forbes 175.5 (2005): 77-78. Business Source Complete. Web. Jan. 6, 2015, 3 pages.

Littleton Partners with Donations Ink (Jan. 19, 2006) US Fed News Service, Including US State News. Web. Jan. 6, 2015, 1 page.

MobileGazette.com, "2006 in Review: The Good, The Bad and The Ugly", published Dec. 2006, retrieved from http://www.mobilegazette.com/2006-review-06x12x22.htm on Nov. 11, 2015.

PC World, "Wipe Your Cell Phone's Memory Before Giving it Away", published Jan. 2006, retrieved from http://www.washingtonpost.

(56) References Cited

OTHER PUBLICATIONS com/wp-dyn/content/article/2006/01/30/AR2006013001144.html on Nov. 10, 2015.
Perng et al., "A Novel Vision System for CRT Panel Auto-Inspection", Proceedings of the 2005 IEEE International Conference on Mechatronics, Jul. 10-12, 2005, pp. 4.
Perng et al., "A Novel Vision System for CRT PaNnel Auto-Inspection", Journal of the Chinese Institute of Industrial Engineers, vol. 24, No. 5, pp. 341-350 (2007).
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
Rolf Steinhilper "Remanufacturing: The Ultimate Form of Recycling", Fraunhofer IRBVerlag, 1998, parts 1-3, http://www.reman.org/Publications_main.htm.
SimplySellular, "Get Cash for your Old Cell Phone", published Apr. 2, 2010, retrieved from http://simplysellular.com/conditions.php on Jan. 6, 2015, 2 pages.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
International Search Report and Written Opinion dated Jan. 12, 2016 in International Application No. PCT/US2015/059351, 11 pages.
Graffia et al., "Retail Station for E-Device Identification, Assessment, and Trade-In", Jun. 6, 2014 (Drawings and Specification) (Year: 2014).
Dennis Bournique: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.
Tecace Software: "Your phone appraisal-Movaluate-Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Co-Pending U.S. Appl. No. 15/855,320 of Forutanpour et al., filed Dec. 27, 2017.
Co-Pending U.S. Appl. No. 15/130,851 of Forutanpour, B. et al., filed Apr. 15, 2016.
Co-Pending U.S. Appl. No. 15/195,828 of Forutanpour, B. et al., filed Jun. 28, 2016.
Co-Pending U.S. Appl. No. 15/630,508 of Silva, J. et al., filed Jun. 22, 2017.
Co-Pending U.S. Appl. No. 15/630,539 of Bowles, M. et al., filed Jun. 22, 2017.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Oliveira, et al., "Automatic crack detection on road imagery using anisotropic diffusion and region linkage," 18th European Signal Processing Conference (EUSIPCO-2010), Aug. 23, 2010, pp. 274-278.
Zhang, Yiyang, "The design of glass crack detection system based on image preprocessing technology," 2014 IEEE 7th Joint International Information Technology and Artificial Intelligence Conference, IEEE, 20 Dec. 20, 2014; pp. 39-42.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).

* cited by examiner

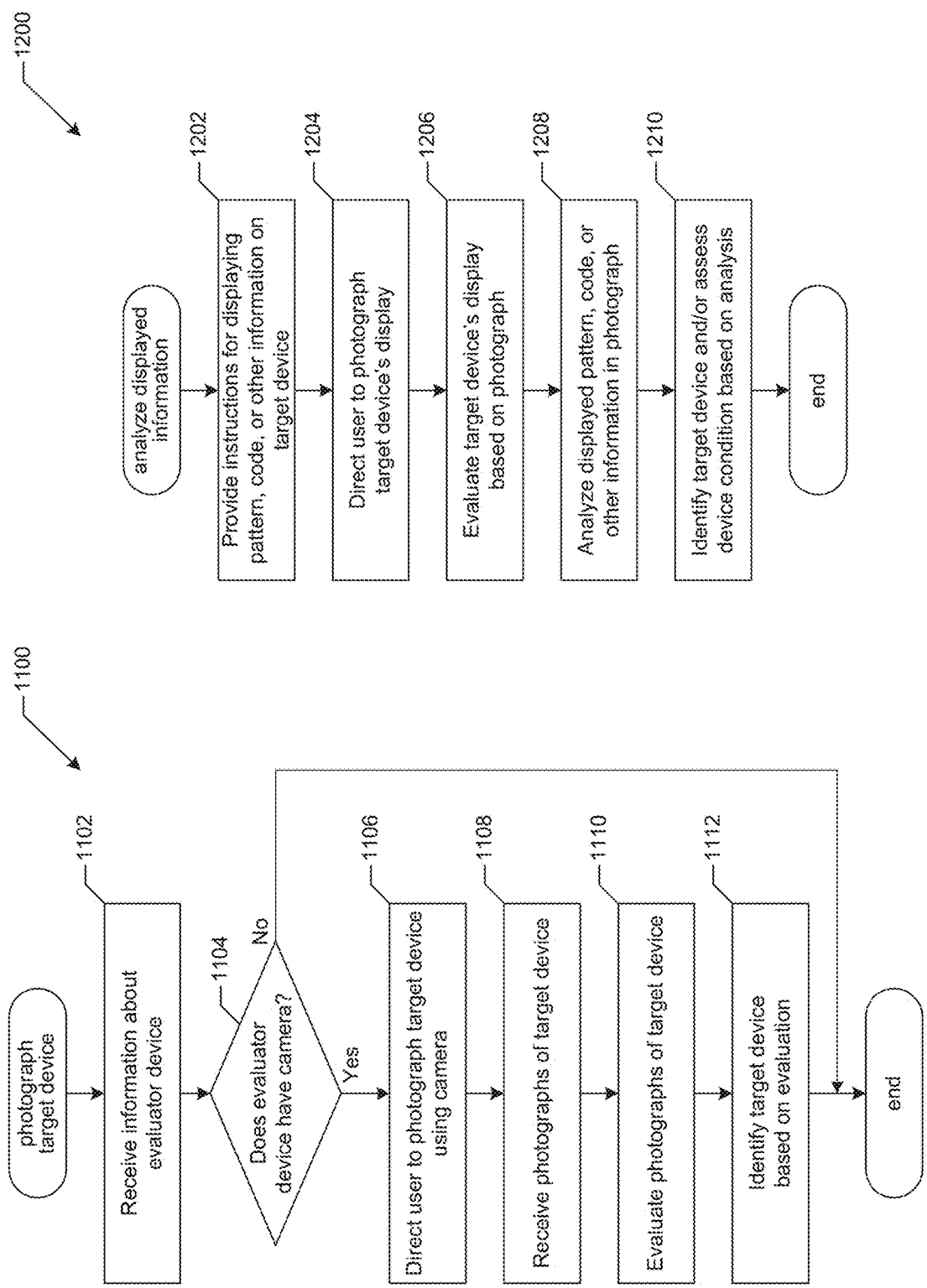

METHODS AND SYSTEMS FOR EVALUATING AND RECYCLING ELECTRONIC DEVICES

CROSS-REFERENCE TO RELATED APPLICATIONS

This application claims the benefit of U.S. provisional application No. 62/076,437, titled "METHODS AND SYSTEMS FOR EVALUATING AND RECYCLING ELECTRONIC DEVICES," filed by the applicant on Nov. 6, 2014, which is incorporated herein by reference in its entirety.

TECHNICAL FIELD

The present disclosure is directed generally to methods and systems for evaluating and recycling mobile phones and other consumer devices and, more particularly, to hardware and/or software for facilitating device identification, evaluation, purchase, and/or other processes associated with electronic device recycling.

BACKGROUND

Consumer electronic devices, such as mobile phones, laptop computers, notebooks, tablets, MP3 players, etc., are ubiquitous. Currently there are over 6 billion mobile devices in use in the world; and the number of these devices is growing rapidly with more than 1.8 billion mobile phones being sold in 2013 alone. By 2017 it is expected that there will be more mobile devices in use than there are people on the planet. In addition to mobile phones, over 300 million desk-based and notebook computers shipped in 2013, and for the first time the number of tablet computers shipped exceeded laptops. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their mobile phones and other electronic devices to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

As an alternative to retailer trade-in or buyback programs, consumers can now recycle and/or sell their used mobile phones using self-service kiosks located in malls, retail stores, or other publically accessible areas. Such kiosks are operated by ecoATM, Inc., the assignee of the present application, and are disclosed in, for example, U.S. Pat. Nos. 8,463,646, 8,423,404, 8,239,262, 8,200,533, 8,195,511, and 7,881,965, which are commonly owned by ecoATM, Inc. and are incorporated herein by reference in their entireties.

There continues to be a need for improving the means available to consumers for recycling or reselling their mobile phones and other electronic devices. Simplifying the recycling/reselling process, enhancing the consumer experience, and discouraging fraud can incentivize consumers to dispose of their old electronic devices in an efficient and environmentally conscientious way.

BRIEF DESCRIPTION OF THE DRAWINGS

FIG. 11 is a flow diagram of a routine for photographically identifying a target device in accordance with embodiments of the present technology.

FIG. 12 is a flow diagram of a routine for analyzing information displayed by a target device in accordance with embodiments of the present technology.

DETAILED DESCRIPTION

Figure 1:
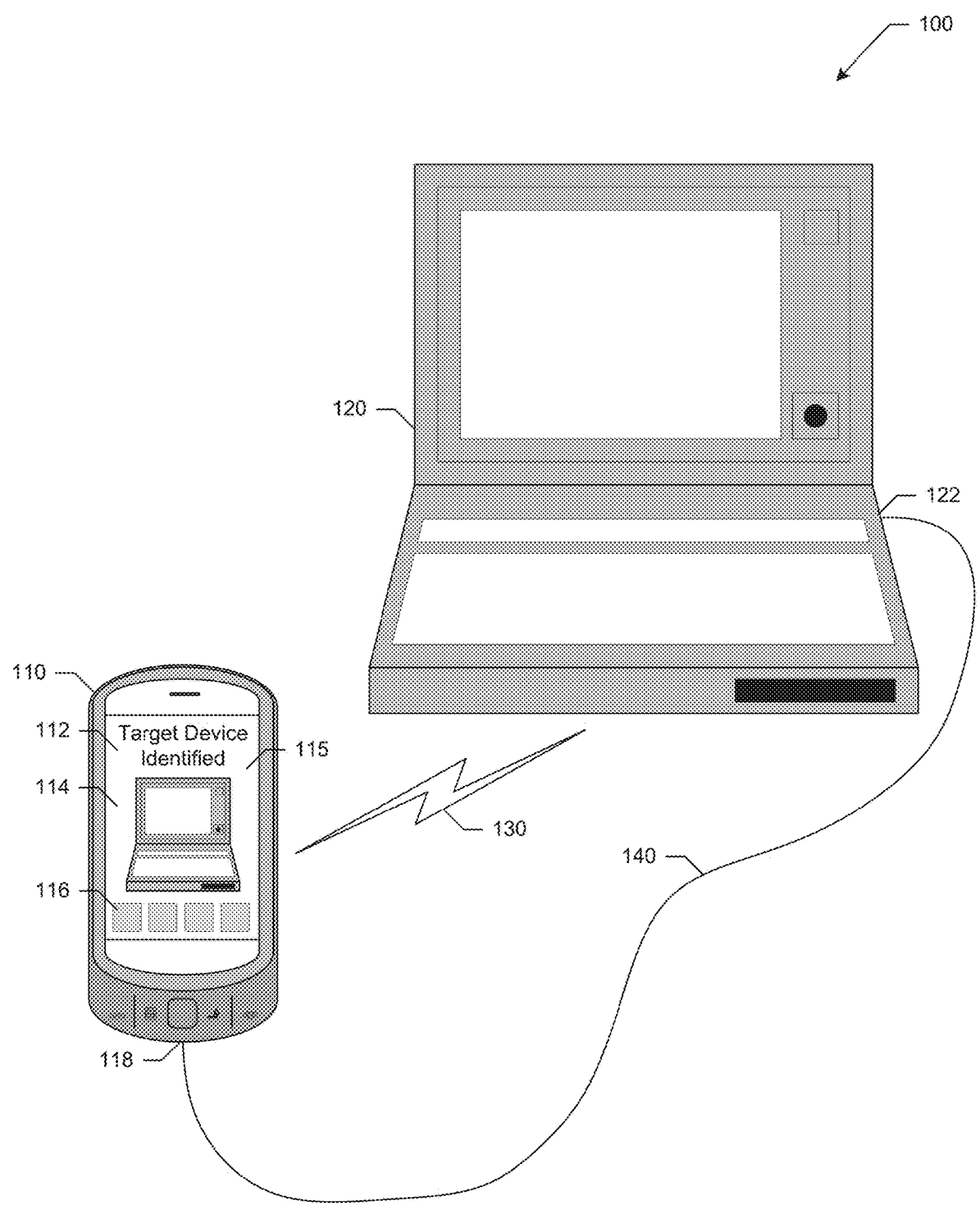
FIG. 1 illustrates an embodiment of a suitable computing environment for implementing various aspects of the present technology.

The following disclosure describes various embodiments of hardware and/or software systems and methods that facilitate the identification, evaluation, purchase, and/or other processes associated with recycling of electronic devices. In various embodiments, for example, the systems and methods described in detail herein enable a user to connect a first electronic device (an "evaluator device"), such as a mobile phone, a tablet computer, a laptop computer, a desktop computer, etc., to a second electronic device (a "target device"), such as another mobile phone, computer, tablet, appliance, peripheral, and so on, to accurately assess the condition and secondhand or resale market value of the target device. For example, a user can connect a laptop computer evaluator device to a mobile phone target device to obtain information about the mobile phone, evaluate the information, and determine how much the mobile phone is worth. As another example, a user could connect a mobile phone evaluator device to a digital video recorder (DVR) target device to get information about the DVR, evaluate that information, and thus find out how much the DVR is worth. The term "target device" is used herein for ease of reference to generally refer to an electronic device that a user may wish to evaluate for recycling. The term "evaluator device" is used herein for ease of reference to generally refer to an electronic device configured to obtain information from and/or about a target device and facilitate processing (e.g., recycling) of the target device. The evaluator device can include application software (an "app") and/or hardware for evaluating the target device, and a facility for wired or wireless connection to the target device. In various embodiments, the app enables device owners and other users to conveniently evaluate and price their electronic devices without having to leave their home or office. The present technology enables device owners to maintain awareness of the market value of their electronic devices with minimal user input, and provides certainty so that owners can have a quick and predictable experience selling their electronic devices (e.g., at an associated recycling kiosk). In some embodiments, the evaluator device can inform the user of the values of their electronic devices, manage a portfolio of electronic devices for recycling, and offer recommendations for where and when to recycle electronic devices.

Certain details are set forth in the following description and in FIGS. 1-15 to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the present technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 illustrates an embodiment of an environment 100 in which various aspects of the present technology can be implemented. The environment 100 includes a first electronic device (e.g., an evaluator device 110) and a second electronic device (e.g., a target device 120). In the illustrated embodiment, the evaluator device 110 is depicted as a handheld computing device such as a smartphone or other mobile phone, and the target device 120 is depicted as a laptop computer. However, in other embodiments, the evaluator device 110 and/or the target device 120 can be any manner of electronic device. For example, the evaluator device 110 could be, e.g., a tablet, laptop computer, desktop computer, or wearable device, and the target device 120 could be, e.g., a plasma television, a handheld gaming device, a media player, a smartphone, a laptop or desktop computer, etc. Although many embodiments of the present technology are described herein in the context of mobile phones, aspects of the present technology are not limited to mobile phones and generally apply to other consumer electronic devices. Such devices include, as non-limiting examples, all manner of mobile phones; smartphones; handheld devices; personal digital assistants (PDAs); MP3 or other digital music players; tablet, notebook, ultrabook and laptop computers; e-readers; all types of cameras; GPS devices; set-top boxes and other media players; VoIP phones; universal remote controls; speakers; headphones; wearable computers; larger consumer electronic devices, such as desktop computers, TVs, projectors, DVRs, game consoles, Blu-Ray Disc™ players, printers, network attached storage devices, etc.; as well smaller electronic devices such as Google® Glass™, smartwatches (e.g., the Apple Watch™, Android Wear™ devices such as the Moto 360®, or the Pebble Steel™ watch), fitness bands, thumb drives, wireless hands-free devices; unmanned aerial vehicles; etc.

In the illustrated embodiment, the target device 120 includes a communication interface (e.g., a connector port 122 and/or a wireless transceiver (not shown)) and the evaluator device 110 similarly includes a communication interface (e.g., a connector port 118 and/or a wireless transceiver (not shown)). In this embodiment, the evaluator device 110 can be electrically connected to the target device 120 via a wireless connection 130 between the respective device transceivers, such as a Wi-Fi or Bluetooth network or an NFC link; or via a wired connection 140, such as a USB, Ethernet, or Lightning cable connected between the device connector ports 118 and 122. A display screen 115 of the evaluator device 110 can display information such as textual information 112 indicating that the evaluator device 110 has identified the target device 120, an image 114 representing the target device 120, and/or icons or buttons 116 enabling the user to elect various options or actions such as confirming the correct identification of the target device 120, pricing the target device 120, saving the target device 120 in a list of devices, etc.

As described in detail below, the present technology enables the evaluator device 110 to obtain information from the target device 120 over the wireless connection 130 and/or the wired connection 140, and evaluate the information to facilitate recycling and/or other processing of the target device 120. The term "processing" is used herein for ease of reference to generally refer to all manner of services and operations that may be performed on, with, or otherwise in relation to a target device. Such services and operations can include, for example, selling, reselling, recycling, donating, exchanging, identifying, evaluating, pricing, auctioning, decommissioning, transferring data from or to, reconfiguring, refurbishing, etc. mobile phones and other electronic devices. The term "recycling" is used herein for ease of reference to generally refer to selling and/or purchasing, reselling, exchanging, donating and/or receiving, etc. electronic devices. For example, owners may elect to sell their used electronic devices, and the electronic devices can be recycled for resale, reconditioning, repair, recovery of salvageable components, environmentally conscious disposal, etc.

Figure 2:
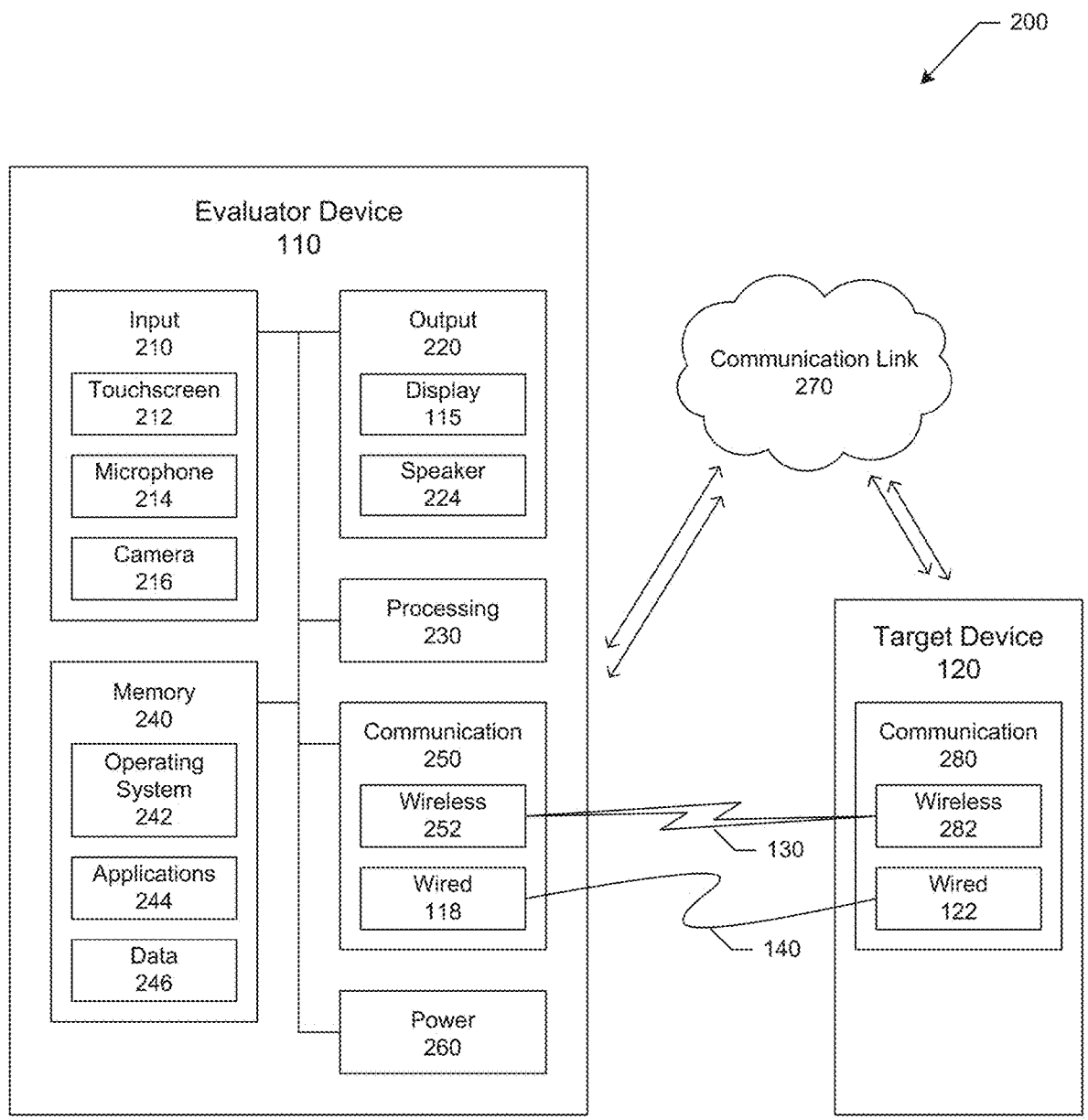
FIG. 2 is a block diagram illustrating various components typically incorporated in computing systems and other devices on which the present technology can be implemented.

FIG. 2 is a block diagram showing some of the components 200 typically incorporated in computing systems and other devices on which the present technology can be implemented. In the illustrated embodiment, the evaluator device 110 includes a processing component 230 that controls operation of the evaluator device 110 in accordance with computer-readable instructions stored in memory 240. The processing component 230 may be any logic processing unit, such as one or more central processing units (CPUs), graphics processing units (GPUs), digital signal processors (DSPs), application-specific integrated circuits (ASICs), etc. The processing component 230 may be a single processing unit or multiple processing units in an electronic device or distributed across multiple devices. Aspects of the present technology can be embodied in a special purpose computing device or data processor that is specifically programmed, configured, or constructed to perform one or more of the computer-executable instructions explained in detail herein. Aspects of the present technology can also be practiced in distributed computing environments in which functions or modules are performed by remote processing devices that are linked through a communications network, such as a local area network (LAN), wide area network (WAN), or the Internet. In a distributed computing environment, modules can be located in both local and remote memory storage devices.

The processing component 230 is connected to memory 240, which can include a combination of temporary and/or permanent storage, and both read-only memory (ROM) and writable memory (e.g., random access memory or RAM), writable non-volatile memory such as flash memory or other solid-state memory, hard drives, removable media, magnetically or optically readable discs, nanotechnology memory, synthetic biological memory, and so forth. As used herein, memory does not include a transitory propagating signal per se. The memory 240 includes data storage that contains programs, software, and information, such as an operating system 242, application programs 244, and data 246. Evaluator device 110 operating systems can include, for example, Windows®, Linux®, Android™, iOS®, and/or an embedded real-time operating system. The application programs 244 and data 246 can include software and databases configured to control evaluator device 110 components, process target device 120 information and data (to, e.g., evaluate device make, model, condition, pricing, etc.), communicate and exchange data and information with remote computers and other devices, etc.

The evaluator device 110 can include input components 210 that receive input from user interactions and provide input to the processor 230, typically mediated by a hardware controller that interprets the raw signals received from the input device and communicates the information to the processor 230 using a known communication protocol. Examples of an input component 210 include a keyboard (with physical or virtual keys), a pointing device (such as a mouse, joystick, dial, or eye tracking device), a touchscreen 212 that detects contact events when it is touched by a user, a microphone 214 that receives audio input, and a camera 216 for still photograph and/or video capture. The evaluator device 110 can also include various other input components 210 such as GPS or other location determination sensors, motion sensors, wearable input devices with accelerometers (e.g. wearable glove-type input devices), biometric sensors (e.g., fingerprint sensors), light sensors, card readers (e.g., magnetic stripe readers or memory card readers) and so on.

The processor 230 can also be connected to one or more various output components 220, e.g., directly or via a hardware controller. The output devices can include a display 115 on which text and graphics are displayed. The display 115 can be, for example, an LCD, LED, or OLED display screen (such as a desktop computer screen, handheld device screen, or television screen), an e-ink display, a projected display (such as a heads-up display device), and/or a display integrated with a touchscreen 212 that serves as an input device as well as an output device that provides graphical and textual visual feedback to the user. The output devices can also include a speaker 224 for playing audio signals, haptic feedback devices for tactile output such as vibration, etc. In some implementations, the speaker 224 and the microphone 214 are implemented by a combined audio input-output device.

In the illustrated embodiment, the evaluator device 110 further includes one or more communication components 250. The communication components can include, for example, a wireless transceiver 252 (e.g., one or more of a Wi-Fi transceiver; Bluetooth transceiver; near-field communication (NFC) device; wireless modem or cellular radio utilizing GSM, CDMA, 3G and/or 4G technologies; etc.) and/or a wired network connection 118 (e.g., one or more of an Ethernet port, cable modem, FireWire cable, Lightning connector, universal serial bus (USB) port, etc.). The communication components 250 are suitable for communication between the evaluator device 110 and other local and/or remote computing devices, e.g., the target device 120, directly via a wired or wireless peer-to-peer connection and/or indirectly via the communication link 270 (which can include the Internet, a public or private intranet, a local or extended Wi-Fi network, cell towers, the plain old telephone system (POTS), etc.). For example, the wireless transceiver 252 of the evaluator device 110 can connect to the wireless transceiver 282 of the target device 120 via the wireless connection 130, and/or the wired connector 118 of the evaluator device 110 can connect to the wired connector 122 of the target device 120 via the wired connection 140. The evaluator device 110 further includes power 260, which can include battery power and/or facility power for operation of the various electrical components associated with the evaluator device 110.

Unless described otherwise, the construction and operation of the various components shown in FIG. 2 are of conventional design. As a result, such components need not be described in further detail herein, as they will be readily understood by those skilled in the relevant art. In other embodiments, the evaluator device 110 and/or the target device 120 can include other features that may be different from those described above. In still further embodiments, the evaluator device 110 and/or the target device 120 can include more or fewer features similar to those described above.

Figure 3:
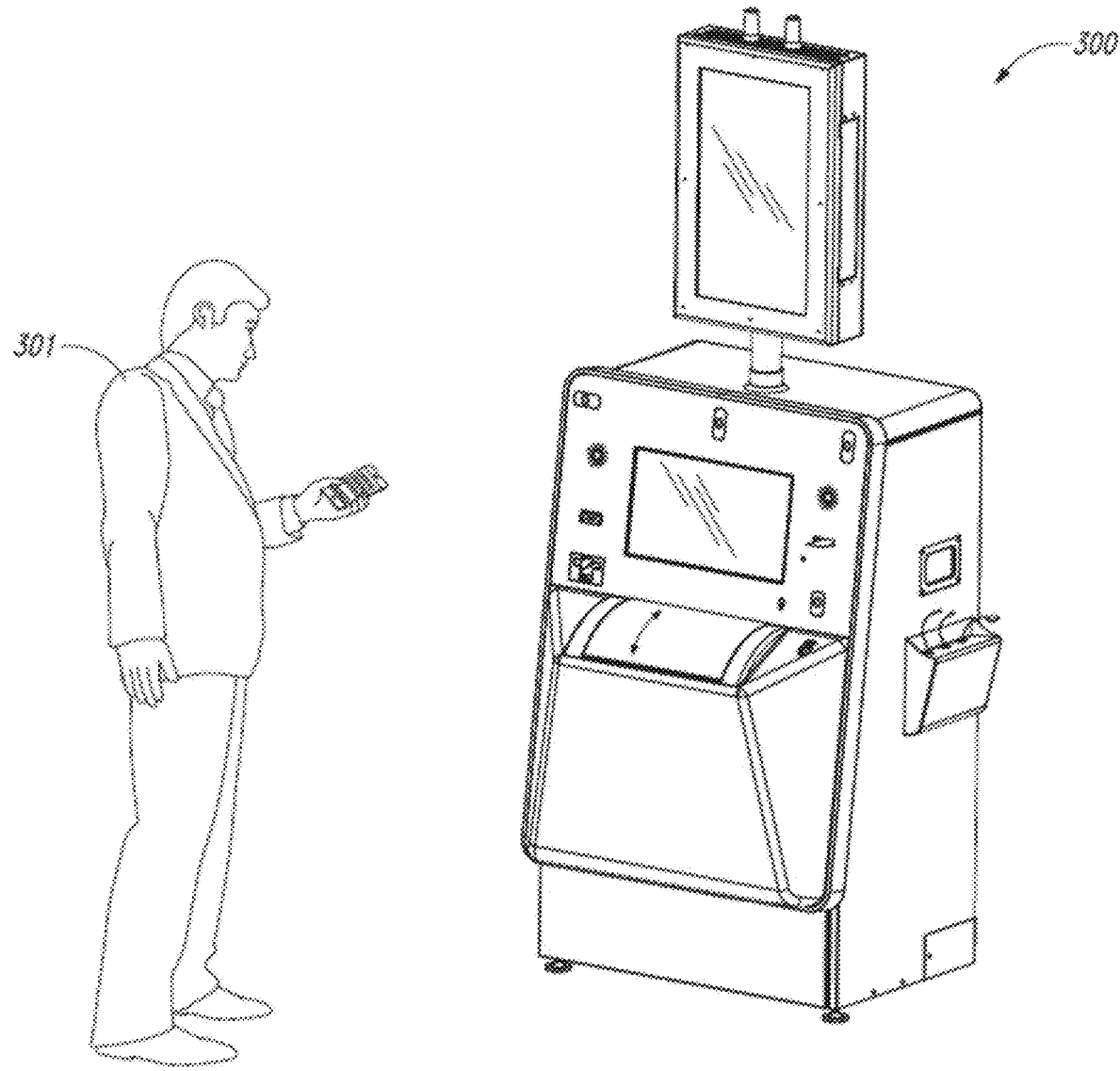
FIG. 3 is an isometric view of a machine configured in accordance with an embodiment of the present technology for recycling electronic devices.

FIG. 3 is an isometric view of a kiosk 300 for recycling and/or other processing of mobile phones and other consumer electronic devices in accordance with the present technology. The kiosk 300 and various features thereof can be at least generally similar in structure and function to the kiosks and corresponding features described in U.S. Pat. Nos. 8,463,646, 8,423,404, 8,239,262, 8,200,533, 8,195,511, and 7,881,965; and in U.S. patent application Ser. Nos. 12/573,089, 12/727,624, 13/113,497, 12/785,465, 13/017,560, 13/438,924, 13/753,539, 13/658,825, 13/733,984, 13/705,252, 13/487,299 13/492,835, 13/562,292, 13/658,828, 13/693,032, 13/792,030, 13/794,814, 13/794,816, 13/862,395 and 13/913,408, each of which is incorporated herein by reference in its entirety. The disclosed technology also includes the disclosures of U.S. patent application Ser. No. 14/498,763, titled "METHODS AND SYSTEMS FOR PRICING AND PERFORMING OTHER PROCESSES ASSOCIATED WITH RECYCLING MOBILE PHONES AND OTHER ELECTRONIC DEVICES," filed by the applicant on Sep. 26, 2014; U.S. patent application Ser. No. 14/500,739, titled "MAINTAINING SETS OF CABLE COMPONENTS USED FOR WIRED ANALYSIS, CHARGING, OR OTHER INTERACTION WITH PORTABLE ELECTRONIC DEVICES," filed by the applicant on Sep. 29, 2014; U.S. provisional application No. 62/059,129, titled "WIRELESS-ENABLED KIOSK FOR RECYCLING CONSUMER DEVICES," filed by the applicant on Oct. 2, 2014; U.S. provisional application No. 62/059,132, titled "APPLICATION FOR DEVICE EVALUATION AND OTHER PROCESSES ASSOCIATED WITH DEVICE RECYCLING," filed by the applicant on Oct. 2, 2014; U.S. patent application Ser. No. 14/506,449, titled "SYSTEM FOR ELECTRICALLY TESTING MOBILE DEVICES AT A CONSUMER-OPERATED KIOSK, AND ASSOCIATED DEVICES AND METHODS," filed by the applicant on Oct. 3, 2014; U.S. provisional application No. 62/073,840, titled "SYSTEMS AND METHODS FOR RECYCLING CONSUMER ELECTRONIC DEVICES," filed by the applicant on Oct. 31, 2014; U.S. provisional application No. 62/073,847, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 31, 2014; U.S. provisional application No. 62/090,855, titled "METHODS AND SYSTEMS FOR PROVIDING INFORMATION REGARDING COUPONS/PROMOTIONS AT KIOSKS FOR RECYCLING MOBILE PHONES AND OTHER ELECTRONIC DEVICES," filed by the applicant on Dec. 11, 2014; U.S. patent application Ser. No. 14/568,051, titled "METHODS AND SYSTEMS FOR IDENTIFYING MOBILE PHONES AND OTHER ELECTRONIC DEVICES," filed by the applicant on Dec. 11, 2014; U.S. provisional application No. 62/091,426, titled "SYSTEMS AND METHODS FOR RECYCLING CONSUMER ELECTRONIC DEVICES," filed by the applicant on Dec. 12, 2014; U.S. patent application Ser. No. 14/598,469, titled "METHODS AND SYSTEMS FOR DYNAMIC PRICING AND PERFORMING OTHER PROCESSES ASSOCIATED WITH RECYCLING MOBILE PHONES AND OTHER ELECTRONIC DEVICES," filed by the applicant on Jan. 16, 2015; U.S. patent application Ser. No. 14/660,768, titled "SYSTEMS AND METHODS FOR INSPECTING MOBILE DEVICES AND OTHER CONSUMER ELECTRONIC DEVICES WITH A LASER," filed by the applicant on Mar. 17, 2015; U.S. patent application Ser. No. 14/663,331, titled "DEVICE RECYCLING SYSTEMS WITH FACIAL RECOGNITION," filed by the applicant on Mar. 19, 2015; U.S. provisional application No. 62/169,072, titled "METHODS AND SYSTEMS FOR VISUALLY EVALUATING ELECTRONIC DEVICES," filed by the applicant on Jun. 1, 2015; U.S. provisional application No. 62/202,330, titled "METHODS AND SYSTEMS FOR INSPECTING MOBILE DEVICES AND OTHER CONSUMER ELECTRONIC DEVICES WITH ROBOTIC ACTUATION," filed by the applicant on Aug. 7, 2015; U.S. provisional application No. 62/221,510, titled "METHODS AND SYSTEMS FOR RECORDING INTERACTIONS WITH A SYSTEM FOR PURCHASING MOBILE PHONES AND OTHER ELECTRONIC DEVICES," filed by the applicant on Sep. 21, 2015; U.S. patent application Ser. No. 14/873,158, titled "WIRELESS-ENABLED KIOSK FOR RECYCLING CONSUMER DEVICES," filed by the applicant on Oct. 1, 2015; U.S. patent application Ser. No. 14/873,145, titled "APPLICATION FOR DEVICE EVALUATION AND OTHER PROCESSES ASSOCIATED WITH DEVICE RECYCLING," filed by the applicant on Oct. 1, 2015; U.S. patent application Ser. No. 14/925,357, titled "SYSTEMS AND METHODS FOR RECYCLING CONSUMER ELECTRONIC DEVICES," filed by the applicant on Oct. 28, 2015; and U.S. patent application Ser. No. 14/925,375, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 28, 2015, each of which is incorporated herein by reference in its entirety. All of the patents and patent applications listed in the preceding sentences are commonly owned by the applicant of the present application, and they along with any other patents or patent applications identified herein are incorporated herein by reference in their entireties.

In the illustrated embodiment, the kiosk 300 is a floor-standing self-service kiosk configured for use by a user 301 (e.g., a consumer, customer, etc.) to recycle, sell, and/or perform other operations with a target device 120 such as a mobile phone or other consumer electronic device. In other embodiments, the kiosk 300 can be configured for use on a countertop or a similar raised surface. Although the kiosk 300 is configured for use by consumers, in various embodiments the kiosk 300 and/or various portions thereof can also be used by other operators, such as a retail clerk or kiosk assistant to facilitate the selling or other processing of target devices 120 such as mobile phones and other electronic devices.

The kiosk 300 can used in a number of different ways to efficiently facilitate the recycling, selling and/or other processing of target devices 120 such as mobile phones and other consumer electronic devices. For example, a user wishing to sell a used mobile phone or other target device 120 can bring the target device 120 to the kiosk 300 for recycling. In some embodiments, the kiosk 300 can perform a visual analysis and/or an electrical analysis, verify the user's identity, and pay the user 301 for the target device 120 using one or more of the methods and/or systems described in detail in the commonly owned patents and patent applications identified herein and incorporated by reference in their entireties.

As those of ordinary skill in the art will appreciate, various embodiments of the kiosk 300 can be used for recycling virtually any consumer electronic device, such as mobile phones, MP3 players, tablet computers, laptop computers, e-readers, PDAs, Google® Glass™, smartwatches, and other portable or wearable devices, as well as other relatively non-portable electronic devices such as desktop computers, printers, televisions, DVRs, devices for playing games, entertainment or other digital media on CDs, DVDs, Blu-ray™, etc.

Figure 4:
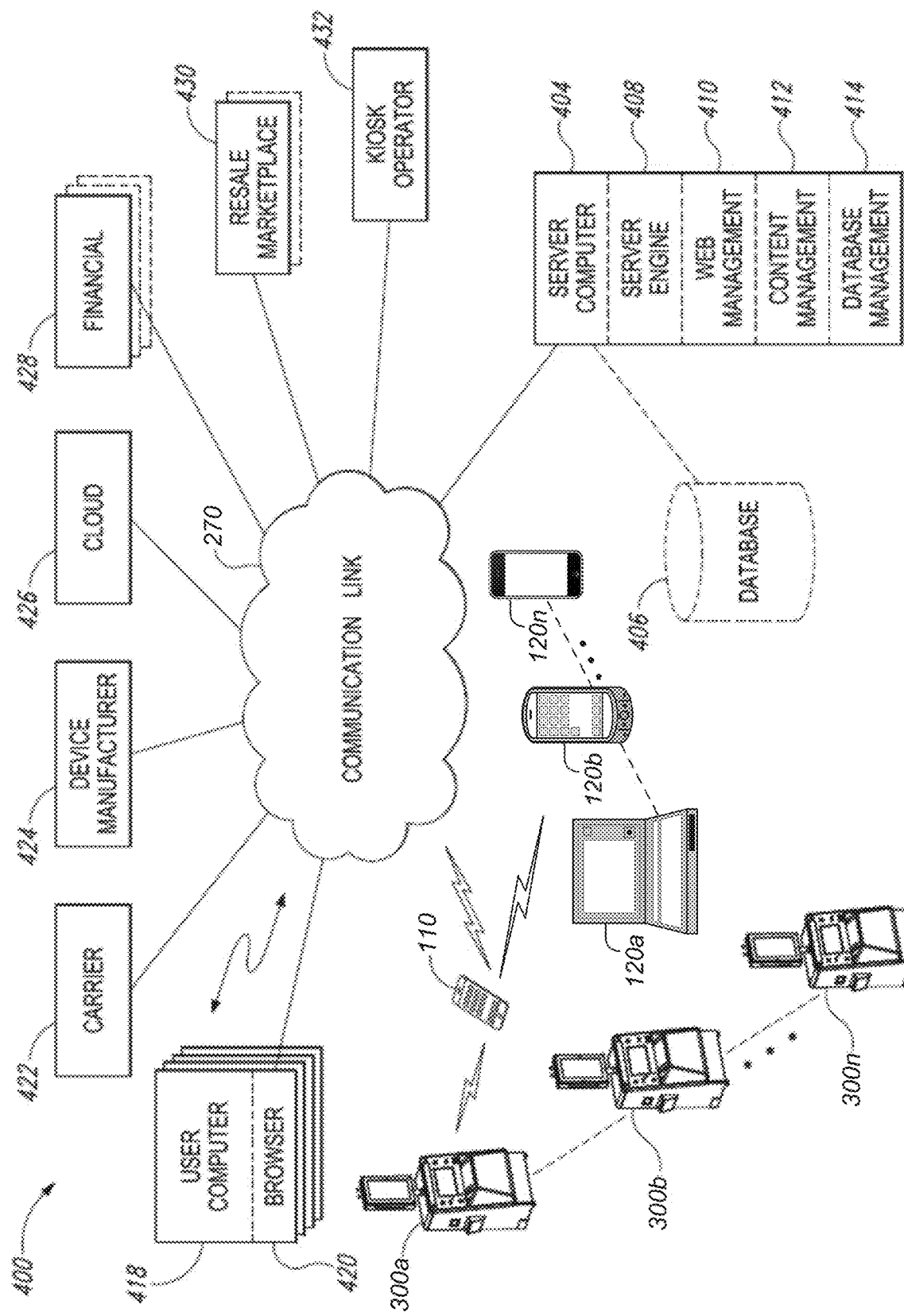
FIG. 4 is a schematic diagram of a suitable distributed computing environment for implementing various aspects of the present technology.

FIG. 4 is a schematic diagram of a suitable network environment for implementing various aspects of a target device 120 evaluating and recycling system 400 configured in accordance with embodiments of the present technology. In the illustrated embodiment, various computing devices including the evaluator device 110 and a plurality of the kiosks 300 (identified individually as kiosks 300a-300n) can exchange information with one or more remote computers (e.g., one or more server computers 404) via the communication link 270. Although the communication link 270 can include a publically available network (e.g., the Internet with a web interface), a private communication link, such as an intranet or other network can also be used. Moreover, in various embodiments the individual evaluator device 110 and/or kiosk 300 can be connected to a host computer (not shown) that facilitates the exchange of information between the evaluator device 110, the kiosks 300, remote computers, other kiosks, mobile devices, etc.

The server computer 404 can perform many or all of the functions for receiving, routing and storing of electronic messages, such as data lookup queries, webpages, audio signals and electronic images necessary to implement the various electronic transactions described herein. For example, the server computer 404 can retrieve and exchange web pages and other content with an associated database or databases 406. In some embodiments, the database 406 can include information related to target devices 120 such as mobile phones and/or other consumer electronic devices. Such information can include, for example, make, model, serial number, International Mobile Equipment Identity (IMEI) number, carrier plan information, pricing information, owner information, etc. In various embodiments the server computer 404 can also include a server engine 408, a web page management component 410, a content management component 412, and a database management component 414. The server engine 408 can perform the basic processing and operating system level tasks associated with the various technologies described herein. The webpage management component 410 can handle creation and/or display and/or routing of web or other display pages. The content management component 412 can handle many of the functions associated with the routines described herein. The database management component 414 can perform various storage, retrieval and query tasks associated with the database 406, and can store various information and data such as animation, graphics, visual and audio signals, etc.

In the illustrated embodiment, the evaluator device 110 and/or the kiosks 300 can also be operably connected to each other and/or to a plurality of other remote devices and systems via the communication link 270. For example, the kiosks 300 can be operably connected to a plurality of user devices 418 (e.g., personal computers, laptops, handheld devices, etc.) having associated browsers 420. Similarly, as described above the evaluator device 110 can include wired and/or wireless communication facilities for exchanging digital information with target devices for recycling 120 (identified individually as target devices 120a-120n). The evaluator device 110, the kiosks 300, and/or the server computer 404 are also operably connectable to a series of remote computers for obtaining data and/or exchanging information with necessary service providers, financial institutions, device manufactures, authorities, government agencies, etc. For example, the evaluator device 110, the kiosks 300, and/or the server computer 404 can be operably connected to one or more cell carriers 422, one or more device manufacturers 424 (e.g., mobile phone manufacturers), one or more electronic payment or financial institutions 428, one or more databases (e.g., the GSMA IMEI Database, etc.), and one or more computers and/or other remotely located or shared resources associated with cloud computing 426. The financial institutions 428 can include all manner of entity associated with conducting financial transactions, including banks, credit/debit card facilities, online commerce facilities, online payment systems, virtual cash systems, money transfer systems, etc.

In addition to the foregoing, the evaluator device 110, the kiosks 300, and/or the server computer 404 can also be operably connected to a resale marketplace 430 and a kiosk operator 432. The resale marketplace 430 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The kiosk operator 432 can be a central computer or system of computers for controlling all manner of operation of the network of kiosks 300.

The foregoing description of the target device 120 evaluating and recycling system 400 illustrates but one possible network system suitable for implementing the various technologies described herein. Accordingly, those of ordinary skill in the art with appreciate that other systems consistent with the present technology can omit one or more of the facilities described in reference to FIG. 4, or can include one or more additional facilities not described in detail in FIG. 4.

The evaluator device 110, kiosks 300, target devices 120, server computers 404, user computers or devices 418, etc. can include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computers can include other program modules such as an operating system, one or more application programs (e.g., word processing or spreadsheet applications), and the like. The computers can include wireless computers, such as mobile phones, personal digital assistants (PDAs), palm-top computers, tablet computers, notebook and laptop computers, desktop computers, e-readers, music players, GPS devices, wearable computers such as smartwatches and Google® Glass™, etc., that communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown, a private network, such as an intranet can likewise be used herein. The network can have a client-server architecture, in which a computer is dedicated to serving other client computers, or it can have other architectures such as peer-to-peer, in which one or more computers serve simultaneously as servers and clients. A database or databases, coupled to the server computer(s), stores much of the web pages and content exchanged between the user computers. The server computer(s), including the database(s), can employ security measures to inhibit malicious attacks on the system, and to preserve integrity of the messages and data stored therein (e.g., firewall systems, message encryption and/or authentication (e.g., using transport layer security (TLS) or secure sockets layer (SSL)), password protection schemes, encryption of stored data (e.g., using trusted computing hardware), and the like).

One skilled in the relevant art will appreciate that the concepts of the invention can be used in various environments other than location based or the Internet. In general, a display description can be in HTML, XML, or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, can be used instead of the Internet. The system can be conducted within a single computer environment, rather than a client/server environment. Also, the user computers can comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a LAN, a WAN, or the Internet. In a distributed computing environment, program modules can be located in both local and remote memory storage devices.

Those of ordinary skill in the art will appreciate that the routines and other functions and methods described herein can be implemented as an application specific integrated circuit (ASIC), by a digital signal processing (DSP) integrated circuit, through conventional programmed logic arrays and/or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

Aspects of the invention can be stored or distributed on tangible computer-readable media, including magnetically or optically readable computer discs, hard-wired or preprogrammed chips (e.g., EEPROM semiconductor chips), nanotechnology memory, synthetic biological memory, or other data storage media. The data storage devices can include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a transitory propagating signal per se.

Figure 5:
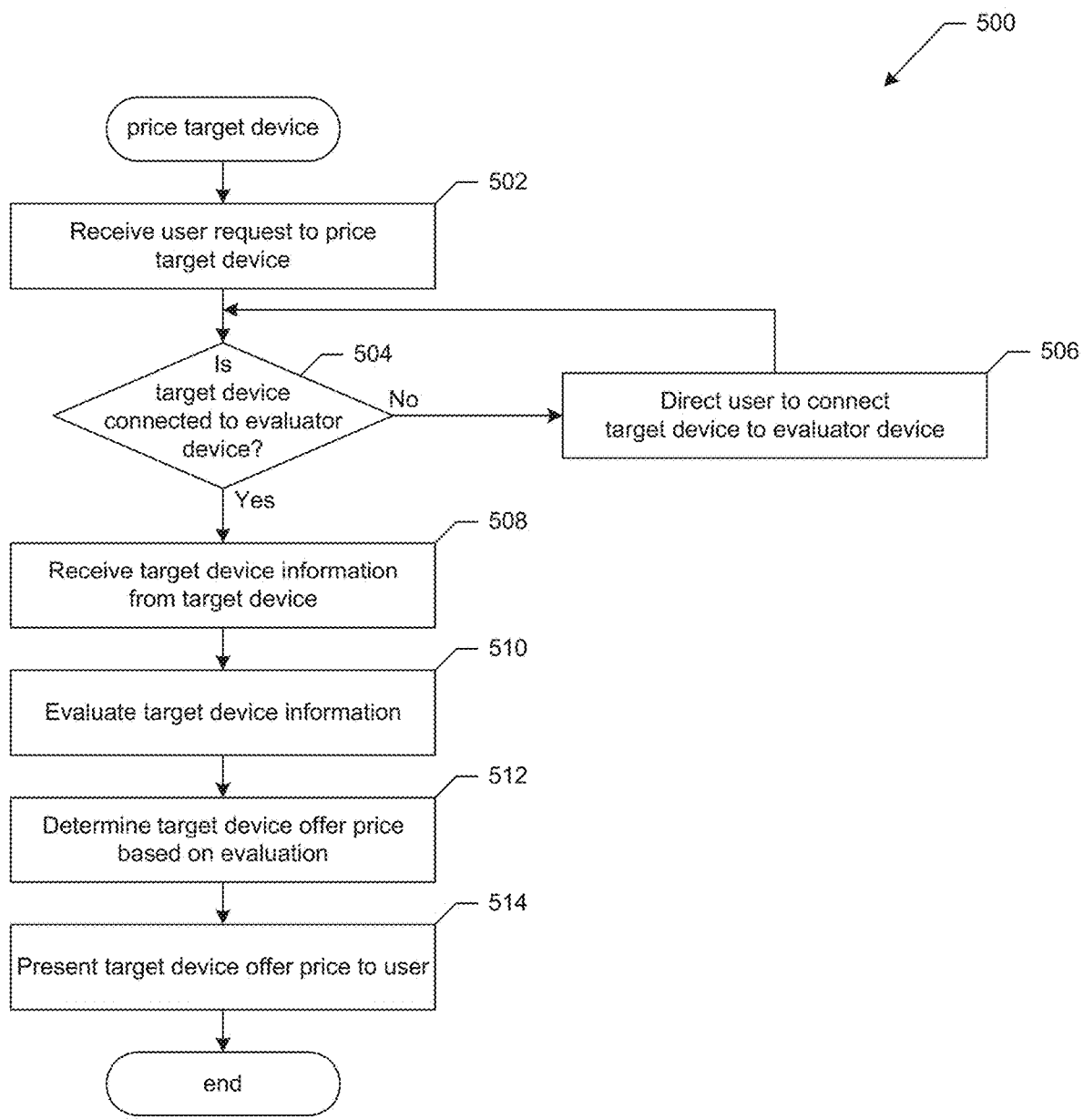
FIG. 5 is a high-level flow diagram of a routine for pricing a target device for recycling in accordance with embodiments of the present technology.

FIG. 5 is a high-level flow diagram of a routine 500 for pricing a target device 120 (e.g., a mobile phone, tablet computer, thumb drive, TV, SLR, etc.) for recycling in accordance with embodiments of the present technology. In various embodiments, an app running on an evaluator device (e.g., the evaluator device 110 of FIG. 1) such as a mobile phone or computer, and/or another processing device operatively connectable to the app, such as a remote computer (e.g., a server), can perform some or all of the routine 500. In some instances, for example, a user who owns a target device 120 (e.g., a game console, laptop, smartphone, etc.) may want to know how much the target device 120 is worth so that he or she can decide whether to sell it. The routine 500 of FIG. 5 enables the user to use another electronic device (e.g., the evaluator device 110) to quickly obtain a current price for the target device 120, without requiring the user to bring the target device 120 to a recycling kiosk 300, a retail outlet, or another location, and without requiring the user to manually provide information about the target device 120 and its configuration.

In various embodiments, the routine 500 and the other flow routines described in detail herein can be implemented by an evaluator device 110 running an app that can obtain information about a connected target device 120. The target device 120 may be, for example, one of various consumer electronic devices, such as a used mobile telecommunication device, which includes all manner of handheld devices having wired and/or wireless communication capabilities (e.g., a smartphone, computer, TV, game console, home automation device, etc.). In some embodiments, the user downloads the app to the evaluator device 110 from an app store or other software repository associated with the device manufacturer 424 or a third party (e.g., the Apple® App Stores™, Google Play™ store, Amazon® Appstore™, and so on), from a website (e.g., a website associated with the kiosk operator 432), from a kiosk such as the kiosk 300 (e.g., sideloading an app over a wired or wireless data connection), from a removable memory device such as an SD flash card or USB drive, etc. In some embodiments, some or all of the app is loaded and executed via a web page, such as in the form of a script executed in a browser application when the user navigates to, e.g., a website associated with the kiosk operator 432. In other embodiments, the app is loaded on the evaluator device 110 before it is first acquired by the user (e.g., preinstalled by the device manufacturer 424, a wireless service carrier 422, or a device vendor).

In block 502, the routine 500 receives a user request to price a target device 120. For example, the user can activate the app on the evaluator device 110 (e.g., by selecting an icon 116 representing the app on the touch screen 212 of the evaluator device 110, or, if the evaluator device is, e.g., a laptop or desktop computer, by using keyboard and mouse input devices to run the app program on the evaluator device) and choose a "What are my other devices worth?" function to begin a process to price one or more target devices 120. In some embodiments, the app enables the user to select a particular target device 120 from a list of electronic devices corresponding to devices connected to the evaluator device 110 and/or a list of electronic devices previously saved in the memory 240 for evaluation and pricing. In some embodiments, the routine 500 enables the user to select the evaluator device 110 itself (e.g., the electronic device on which the app is installed and/or running) as the target device 120. One advantage of embodiments of the present technology is that the user can use the app on the evaluator device 110 to price the target device 120 without having to take the target device 120 to a kiosk 300 or other remote location.

In some instances, the target device 120 is electrically connected to the evaluator device 110 (e.g., via a data cable 140 or wireless data connection 130), while in other instances, the target device 120 may be disconnected from the evaluator device 110 when the user wants to find out how much the target device 120 is worth. In decision block 504, the routine 500 determines whether the target device 120 is connected to the evaluator device 110. For example, the app running on the evaluator device 110 can scan various wired network connections 118 and/or wireless network connections 252 of the evaluator device 110 to assemble a list of possible target devices 120 connected to the evaluator device 110, and/or to determine whether a particular target device 120 (e.g., a target device 120 previously identified and saved to memory 240) is electrically connected to the evaluator device 110.

If the target device 120 is not connected to the evaluator device 110, then in block 506 the routine 500 directs the user to connect the target device 120 to the evaluator device 110 via a wired connection 140 or a wireless connection 130. For example, the app can display instructions on the screen 115 of the evaluator device 110 for the user to connect the devices by plugging a USB cable into both devices (e.g., the wired connector 118 of the evaluator device 110 and the wired connector 122 of the target device 120), by pairing the devices to each other over a short-range communication link such as Bluetooth or NFC, or by joining both devices to a common network such as an Ethernet or Wi-Fi LAN. In some embodiments, the routine 500 can associate a target device 120 with one or more connection types, so that the instructions to connect the target device 120 to the evaluator device 110 are specific to an associated connection type. In some embodiments, the app is configured to automatically detect when the target device 120 is connected to the evaluator device 110. For example, the app can register with the evaluator device operating system 242 to receive a notification when new hardware is operably connected to the evaluator device 110. The routine 500 can thus automatically detect newly connected target devices 120 and provide an indication of the new devices to the user. In some embodiments, the app receives user input (e.g., by selection of an option on the touchscreen 212) indicating that the target device 120 is available via a wired connection 140 or a wireless connection 130, and the app can attempt to connect to the indicated target device 120. After block 506, the routine 500 returns to decision block 504.

Once the target device 120 is connected to the evaluator device 110, the routine 500 continues in block 508. In block 508, the routine 500 receives or otherwise obtains information about the target device 120 from the target device 120 via the app. In some embodiments, the routine 500 obtains the information automatically, i.e., without receiving manual user input of the information. For example, a USB host (e.g., the evaluator device 110) can prompt a USB peripheral (e.g., the target device 120) to transmit its vendor ID number (a code identifying the manufacturer of the USB peripheral) and its device ID number (a code identifying the model of the USB peripheral). In some embodiments, the evaluator device 110 is connected to the target device 120 via a USB cable, and the evaluator device 110 receives vendor ID and device ID codes from the target device 120 over the USB cable connection. In other embodiments, the evaluator device 110 is connected to the target device by one or more of various other types of wired or wireless data connections, and can obtain different information, such as described below with reference to FIG. 10. The routine 500 can store the information about the target device 120 in a data structure on the evaluator device 110 (e.g., in a table maintained by the app) and/or remotely from the evaluator device 110 (e.g., in a data structure maintained at one or more of the server computer 404, the cloud storage facility 426, the kiosk 300, etc.).

In block 510, the routine 500 evaluates the target device information. In some embodiments, the routine 500 performs the evaluation automatically, i.e., without receiving user input manually evaluating the target device 120. As part of evaluating the target device 120, the evaluator device 110 can identify the target device 120 and/or assess its condition. For example, the evaluator device 110 can identify the target device 120 by determining one or more of the target device platform, make, model, carrier (for a mobile phone, for example), features, configuration (e.g., memory and/or other storage capacity), upgrades, peripherals, etc. based on the target device information. For example, if the information includes a device part number MD761LL/B, the evaluation can determine that the target device 120 is an Apple® MacBook Air® laptop computer with a 13.3" screen and 256 GB of flash storage from early 2014. In various embodiments, the app or a remote server can query a local or remote database (e.g., the database 406) using the target device information. For example, after the app receives USB vendor ID and device ID codes, the routine 500 can search a local and/or remote data structure that maps those codes to information about the USB device. As another example, the app or the remote server can obtain information including a mobile phone IMEI number and can then communicate remotely (via, e.g., a wireless or wired link) with a backend database such as the GSMA IMEI Database, parsing the IMEI to determine or verify the make and/or model of the mobile phone.

In block 512, the routine 500 determines an offer price for the target device 120 based on the evaluation performed in block 510. For example, the routine 500 can consult a local or remote database (for example, the database 406) to price the target device 120 based on the information and the evaluation of the target device 120. For example, when the evaluation has determined the make, model, and configuration of the target device 120, the routine 500 can search a data structure that maps the make, model, and/or configuration of the device to a price for the device. For example, if the evaluation has determined that the target device 120 is an Apple® MacBook Air® laptop computer with a 13.3" screen and 256 GB of flash storage from early 2014, the routine 500 can query a pricing data structure or service to obtain a current price for the target device 120 based on that determination. In some embodiments, the app can transmit some or all of the information received in block 508 and/or the results of the evaluation performed in block 510 to a remote server. The remote server can then use the information and/or evaluation results to determine the current market value of the target device 120 (such as by looking up the value of the target device 120 in a database) and return a price that the app can offer the user for the target device 120. In other embodiments, the app on the evaluator device 110 downloads pricing data from a remote server (e.g., the server computer 404 of FIG. 4), and the app determines an offer price for the target device 120 based on the pricing data downloaded from the server. For example, in some embodiments, the app can download a database of prices, such as a lookup table, pricing model, or other data structure containing prices for popular electronic devices. The app can use the information about the make and model of the target device 120 to look up the current value of the subject target device 120 in the table. In various embodiments, the pricing data is updated periodically, such as daily. The routine 500 can ensure that such pricing data is kept current, so that the app offers only current, accurate prices. In some instances, the price includes a range of prices or a price that is contingent on the user bringing the target device 120 to one of the kiosks 300 for identification and/or evaluation and deposit.

In block 514, the routine 500 presents the price for the target device 120 to the user. For example, the app can display the price on the display screen 115 of the evaluator device 110, and/or a remote server can send the user a text message or email containing the price that the user can obtain by selling the target device 120 within a certain time at one of the kiosks 300, an associated retailer, etc. For example, the routine 500 can indicate that the offer price will be valid for a certain period of time. In some embodiments, the app enables the user to commit to bringing the target device 120 to the kiosk 300 at, for example, a set time or within a set period of time. In some embodiments, the app can reward the user with incentives for bringing the target device 120 to the kiosk 300. Such incentives can include, for example, a time-expiring offer, a coupon valid at a store nearby or containing the kiosk 300, a bonus for recycling additional devices, a referral bonus, etc. After block 514, the routine 500 ends.

FIG. 5 and the flow diagrams that follow are representative and may not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented. Those skilled in the art will appreciate that the blocks shown in FIG. 5 and in each of the flow diagrams discussed below may be altered in a variety of ways. For example, while processes or blocks are presented in a given order, alternative implementations may perform routines in a different order, and some processes or blocks may be rearranged, deleted, moved, added, subdivided, combined, and/or modified to provide alternative or sub-combinations. Each of these processes or blocks may be implemented in a variety of different ways. Also, although processes or blocks are at times shown as being performed in series, these processes or blocks may instead be performed or implemented in parallel, or may be performed at different times. Some of the blocks depicted in FIG. 5 and the other flow diagrams are of a type well known in the art, and can themselves include a sequence of operations that need not be described herein. Those of ordinary skill in the art can create source code and/or microcode, program logic arrays, or otherwise implement the invention based on the flow diagrams and the detailed description provided herein.

In various embodiments, all or a portion of the routine 500 and the routines in the other flow diagrams herein can be implemented by means of a consumer or other user (such as a retail employee) operating one or more of the electronic devices and systems described above. For example, in some embodiments, the routine 500 and other routines disclosed herein can be implemented by a mobile device, such as the evaluator device 110 described above with reference to FIGS. 1 and 2 (e.g., a smartwatch, a smartphone, a tablet computer, a laptop computer, etc.). For example, in some instances the app can run on one or more evaluator devices 110 and/or on one or more target devices 120 such as the target devices 120a-120n of FIG. 4. In some embodiments, portions (e.g., blocks) of the routine can be performed by one or more of the kiosks 300a-300n of FIG. 4, and/or by one or more remote computers. For example, such remote computers can include one or more of the server computers 404 of FIG. 4 and/or computing resources associated with the cloud 426, the resale marketplace 430, and/or the kiosk operator 432 operating separately or in combination. The kiosk 300 and/or the remote computers can perform the routines described herein using one or more local and/or remote databases (e.g., the database 406 of FIG. 4, such as the GSMA IMEI Database). Accordingly, the description of the routine 500 and the other routines disclosed herein may refer interchangeably to the routine, the app, the evaluator device 110, the target device 120, and/or the kiosk 300 performing an operation, with the understanding that any of the above devices, systems, and resources can perform all or part of the operation.

While various embodiments of the present technology are described herein using mobile phones and other handheld devices as examples of electronic devices, the present technology applies generally to all types of electronic devices. For example, in some embodiments, the app can be installed and/or run on a larger evaluator device 110 and/or target device 120, e.g., a laptop or tower computer, to perform all or a portion of the routine 500. For example, the app can inventory a laptop or desktop computer and provide the user a confirmation code that the user can print out and bring to a kiosk or to an associated retailer location or point of sale (or send in with the computer via, e.g., courier, mail, or package delivery service) as a receipt. The code can identify the target device 120 and represent the agreed price determined according to the valuation performed by the app based on the information it obtained from the target device 120 and on any user-provided supplemental information. In some embodiments, the app and/or the receipt can indicate any elements that require independent verification (e.g., undamaged screen glass) for the user to receive the agreed price for the target device 120. The user can then take the target device 120 to the retail storefront or point of sale (or, e.g., to the kiosk 300 for viewing by a remote kiosk operator) for its condition to be independently verified, after which the user can deposit the target device 120. The user can then receive the price upon verified receipt of the target device 120, such as a retailer or the kiosk 300 issuing cash, a credit, or a card such as a gift card.

Figure 6:
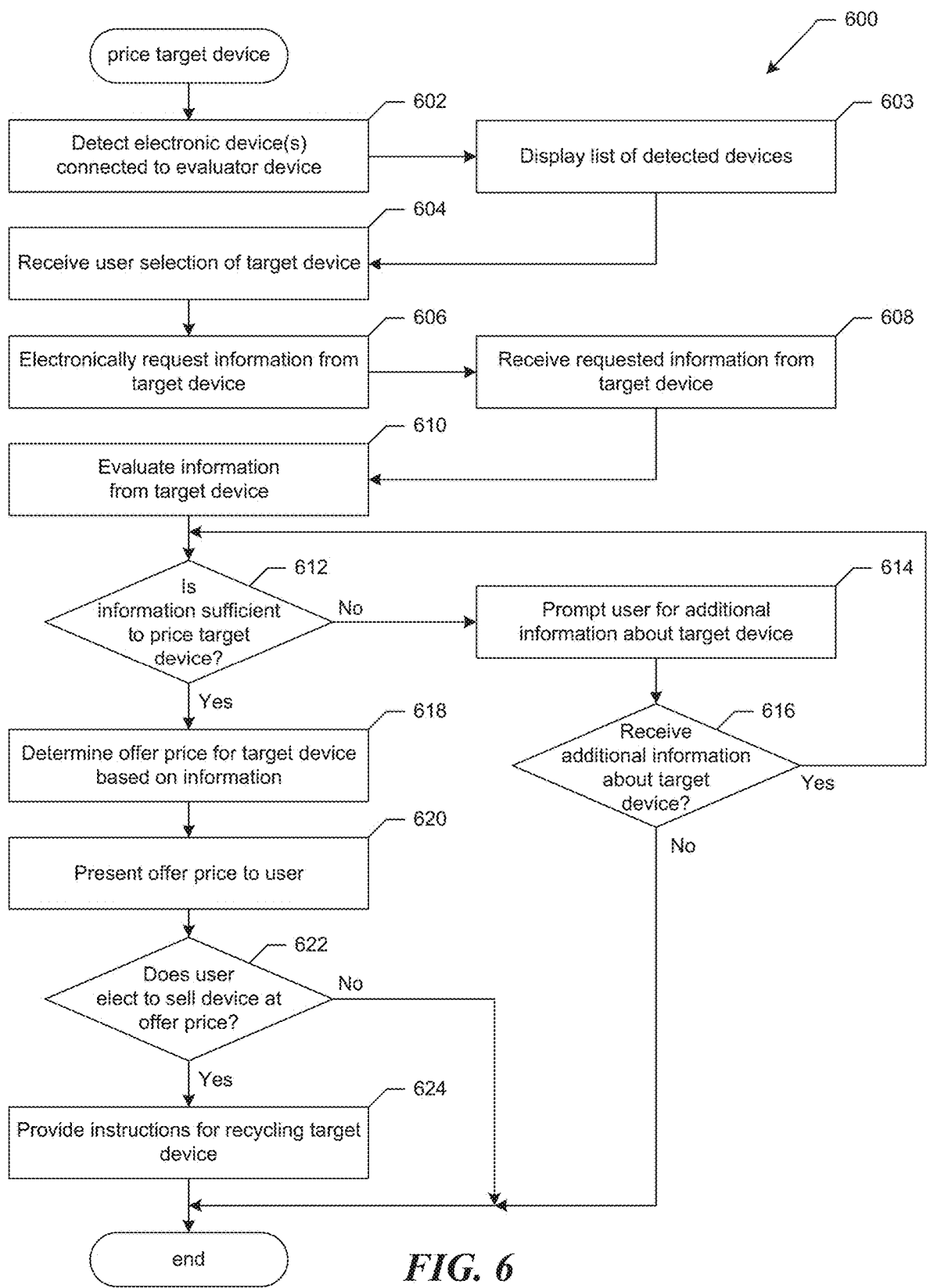
FIG. 6 is a flow diagram of a routine for pricing a target device for recycling in accordance with embodiments of the present technology.

FIG. 6 is a flow diagram of a routine 600 for pricing a target device 120 (e.g., a mobile phone, laptop computer, VoIP phone, projector, smartwatch, speakers, etc.) for recycling in accordance with embodiments of the present technology. The routine 600 of FIG. 6 depicts a process similar to the routine 500 of FIG. 5 but may have additional and/or alternative steps. In various embodiments, an app running on an evaluator device (e.g., the evaluator device 110 of FIG. 1) and/or another processing device operatively connectable to the app, such as a remote server, can perform some or all of the routine 600. In some instances, a user who owns a target device 120 may want to know how much the target device 120 is worth so that he or she can make an informed decision about whether to sell it. The routine 600 of FIG. 6 enables the device owner to use the evaluator device 110 (e.g., the app that the user downloaded to his or her mobile phone or other electronic device, or a script associated with a web page loaded in a browser running on the user's computer or other electronic device) to conveniently price the target device 120.

In block 602, the routine 600 detects which electronic device or devices are connected to the evaluator device 110. For example, the app running on the evaluator device 110 can query an operating system 242 Application Programming Interface (API) of the evaluator device 110 to obtain information about peripherals or other electronic devices operably connected to the evaluator device 110, such as USB devices (speakers, printers, hard disk drives, mobile phones, computers, etc.) plugged into the evaluator device 110. For example, in an evaluator device 110 running an Android™ operating system 242, the app can discover USB devices by either using an intent filter to be notified of each system event when a USB device is attached, or by enumerating USB devices that are already connected using a UsbManager class getDeviceList( ) method. As another example, the app can monitor traffic on networks to which the evaluator device 110 is connected (e.g., Ethernet and/or Wi-Fi), and detect other devices that send communications over those networks.

In block 603, the routine 600 can display a list of detected electronic devices so that the user can select the appropriate target device 120 from the list. For example, the app can display a list of devices, such as the list presented on the display screen 900 illustrated in FIG. 9, on the touchscreen-enabled display 115 of the evaluator device 110, enabling the user to select one of the listed devices (by, e.g., touching the touchscreen 212 interface). In some embodiments, the routine 600 can automatically select or suggest the most likely choice of a target device 120. If more than one electronic device is connected to the evaluator device 110, the routine 600 can use one or more heuristics to rank the electronic devices, e.g., based on the type of connection, the device that was most recently connected, and/or whether and when the user previously evaluated the electronic device. For example, if the user plugged a USB cable from the evaluator device 110 into another electronic device (e.g., a TV set-top box) just before or after starting the process to price a target device 120, the routine 600 can pre-select or suggest the just-connected device as the most likely target device 120 that the user wants to price. In block 604, the routine 600 receives user input selecting one of the target devices 120 from the list of electronic devices connected to the evaluator device 110.

In block 606, the routine 600 electronically requests information from the target device 120 via the app. For example, the request can query the target device 120 for information such as a device identifier. In various embodiments, the format of the request and the type of information that can be received in response depend on the evaluator device 110 platform and on the type of connection between the evaluator device 110 and the target device 120. For example, when a target USB device is connected to a USB host, the host (e.g., the host USB controller) typically queries the device with a GET_DESCRIPTOR query, which is specific to USB connections. In some instances, the evaluator device 110 is a USB host device (e.g., a personal computer) and the target device 120 is a USB device (e.g., a mobile phone) connected via a USB cable to the host device, such that the evaluator device 110 can query the target device 120 directly. Devices connected by other connection types (e.g., FireWire, Bluetooth, Thunderbolt, HDMI, Wi-Fi, etc.) query connected devices according to their associated protocols. In some embodiments, the routine 600 requests information from the target device 120 indirectly. For example, in some instances the target device 120 is a computer that is configured to always act as a USB host device (e.g., the "A-device" connected to the "A" end of a USB cable). When the evaluator device 110 is connected to the target device 120 via USB, the target device 120 controls the USB bus. In such instances, the evaluator device 110 can, for example, act as a mass storage device (e.g., a USB memory stick) that contains an auto-run file configured to be automatically executed by the host computer. When the target device 120 detects the connected evaluator device 110 as a mass storage device, the target device 120 accordingly executes instructions from the auto-run file. The evaluator device 110 can thus cause the target device 120 to copy information from the target device 120 to the evaluator device 110.

In various embodiments, the routine 600 operates at a higher level of abstraction. For example, the app running on the evaluator device 110 can use an interface such as an API of the operating system 242 of the evaluator device 110 to obtain information from the target device 120. For example, in an evaluator device 110 running an Android™ operating system 242, the target device 120 can be represented by an instance of the UsbDevice class, and the app can request information about the target device 120 using calls to the UsbDevice object getVendorId( ) and getDeviceClass( ) methods. Other operating systems 242 (e.g., iOS®, Windows®, etc.) provide corresponding methods for requesting information about connected target devices 120.

In some embodiments, the routine 600 can directly obtain detailed information about the target device 120 and its configuration after the user gives the app permission to obtain some or all of the information that would be useful to determine the value of the target device 120. For example, when an evaluator device 110 is connected to an iOS® target device 120 via USB or Wi-Fi, the target device 120 may display on a touchscreen of the target device 120 a dialog asking the user whether to "Trust This Computer?", i.e., the evaluator device 110, with virtual buttons labeled "Trust" and "Don't Trust". The user can select the "Trust" option allowing the evaluator device 110 to access settings and data on the target device 120. In some instances, the app runs on an evaluator device 110 such as a computer that the user has previously connected to the target device 120, such that the evaluator device 110 can obtain detailed information about the target device 120 without requiring additional user input or permission. For example, if the user has configured the evaluator device 110 and the target device 120 to communicate with each other automatically (e.g., via a device driver, a console application such as Apple® iTunes®, a certificate of trust, etc.), the app can use such automatic connectivity to obtain information about the target device 120. For example, in some embodiments, the app can obtain information through a console application via an API or plugin. As another example, in some instances, the app can be installed and/or run on more than one device, enabling the apps to cooperatively evaluate the target device 120. For example, if the target device 120 and the evaluator device 110 are both running instances of the app, and the app running on the target device 120 can communicate with the app running on the evaluator device 110, then the app running on the target device 120 can directly access information about the target device 120 (e.g., using APIs or data stores) and communicate that information to the app running on the evaluator device 110.

In block 608, the routine 600 receives the information requested from the target device 120 in block 606. For example, in response to a USB GET_DESCRIPTOR query, the target USB device typically transmits codes representing the device class and subclass (indicating the functional type of the device, such as a printer device, smart card device, still imaging device, video device, etc.), the vendor ID (indicating the make of the device, such as Apple, Inc.), and the product ID and release number (indicating the model of the device, such as a Thunderbolt Display). In some embodiments, the routine 600 receives such information about target USB devices in response to a system level API query or by reading a system data file.

In some embodiments, the user allows the evaluator device 110 to have access to the data on the target device 120, and the routine 600 can receive detailed information about the target device 120. For example, on a mobile phone target device 120, the app can access logs to obtain information such as the number of charge-discharge cycles (to indicate the condition of the rechargeable battery in the phone) and/or call logs (to indicate possible issues with radio hardware or software if calls recently were not successfully completed), etc. The app can obtain information necessary to identify and/or evaluate the target device, such as a unique identifier (e.g., an IMEI number or an MEID or equivalent number of a mobile phone, a hardware media access control address (MAC address) of a networkable device, or a model number and serial number of the electronic device); information describing the device manufacturer (e.g., a manufacturer name or ID code), model, characteristics and capabilities (e.g., CPU type and speed, storage capacity (SRAM, DRAM, disk, etc.), wireless carrier, radio bands (frequency ranges and encodings such as CDMA, GSM, LTE, etc.), and/or color), condition; and so on. Characteristic information about a target device includes the device make, model, and configuration. In some embodiments, the app can obtain information about the target device and/or the user (e.g., location information and/or images taken by the target device camera) stored in the memory of the target device 120 and/or access features of the target device 120 such as the camera and/or radios.

In block 610, the routine 600 evaluates the target device information. In various embodiments, the app on the evaluator device 110 and/or a remote server can query a local or remote database (e.g., the database 406) using the information received in block 608. For example, the app can query a USB.org vendor ID list with the target device vendor ID code to obtain the name of the target USB device vendor. As another example, the app or the remote server can obtain a target mobile phone IMEI number and then communicate remotely (via, e.g., a wireless or wired link) with a backend database such as the GSMA IMEI Database, parsing the IMEI to determine or verify the phone make and/or model. The routine 600 can use such queries to obtain meta-information, e.g., to confirm whether various sources of information about the target device 120 are consistent with each other. Evaluating the target device 120 can also include determining what kind of information is and is not available about the target device 120. For example, depending on the type of electronic device, it may or may not be possible to perform tests to gauge the condition of the target device 120 (e.g., to assess the processor, the battery, and/or the screen, and so on). In some embodiments, evaluating the target device 120 includes determining whether the target device 120 is associated with a remote user account that enables remote user control of the target device 120 (such as tracking the target device 120 and/or erasing data from the target device 120), and/or identifying other potential issues that could affect the operation of the target device 120, its resale value, and/or its ability to be resold.

Evaluating the information about the target device 120 can also include, for example, assessing the physical and/or electrical condition of the target device 120 based on that information, so that the app can price the target device 120 based at least in part on its condition. In some embodiments, the app can perform tests to reveal the condition of the target device 120, such as tests of processor performance, battery charging rates and/or capacity, memory tests for quality of the memory, test calls to confirm sufficient operation of device radios, and so forth). The app can perform interactive tests that incorporate user feedback, such as screen tests (e.g., asking the user whether there are any cracks in the glass and/or displaying a solid color or pattern on an LCD or LED display and prompting the user to identify dead or stuck pixels in the display), and/or interactive tests that include user action such as directing the user to activate a function on the target device 120 (e.g., turning on a Bluetooth radio so that the app on the evaluator device 110 can detect and/or test the radio function). In some embodiments, the target device 120 has a display screen, and the routine 600 can cause the target device 120 to display a test pattern or information on its display screen for the user to inspect and/or interact with. If the user is able to view the pattern or information and, e.g., respond to prompts regarding the pattern or information, the routine 600 can establish that the target device screen, touch screen, keyboard, and/or other components of the target device 120 are working. In other embodiments, the routine 600 can cause the target device 120 to display a test pattern or information such as a QR code and instruct the user to take a picture of the test pattern or QR code using a camera associated with the evaluator device 110 (e.g., the camera 216 of FIG. 2). In some embodiments, the routine 600 can cause the evaluator device 110 to automatically obtain an image of the target device 120 when the user positions the target device 120 in the visual field of a camera associated with the evaluator device 110 (e.g., when a QR code is detected). Such a camera can be, e.g., a webcam attached to a personal computer or an integrated video or still camera in a tablet computer or smartphone. The routine 600 can then analyze the picture (e.g., by sending the picture to a server for remote analysis) to determine the condition of the screen and/or the device, as described below with reference to FIG. 12.

In some embodiments, evaluating the target device 120 includes transmitting information about the target device 120 to one or more remote server computers (e.g., to a remote server computer 404, to a cloud computing service 426, to the kiosk operator 432, and/or to the user computer 418). In some embodiments, the routine 600 can send raw information about the target device 120 to a remote storage site (e.g. to a cloud storage site) for later access and evaluation by, e.g., one of the kiosks 300, or can send identifiers of the target device 120 and the results of evaluation processes performed by the app from the evaluator device 110 to a remote server (such as the server computer 404 of FIG. 4).

In decision block 612, the routine 600 determines whether the information is sufficient for the app and/or a remote server to determine an offer price for the target device 120, or whether additional data or evaluation is needed to price the target device 120. The determination can include, for example, whether the evaluation of the type and condition of the target device 120 is sufficient to determine an offer price or whether the target device 120 could be in a range of possible prices. For example, to determine a price for the target device 120, the routine 600 may require information about the make and model of the target device 120, or one or more unique identifiers of the target device 120 to look up a current price for the device in a database or pricing model. The database or pricing model can be, for example, a local lookup table of common devices on the evaluator device 110 and/or a remotely hosted database or web service to which the app can transmit information about the target device 120 and receive a current market value or offer price for the target device 120.

Accordingly, the evaluation of the target device type and condition may be insufficient to determine a price or a price range for the target device 120 if additional information about the target device 120 is needed (e.g., if the app does not have access to a model number or a unique identifier of the target device), and/or if the evaluation is unable to positively identify the target device 120. In some instances, for example, the evaluation can identify the target device 120 as one of a group of devices (e.g., a Samsung® Galaxy® device, a family that includes a large number of devices such as tablet computers and smartphones), but cannot specifically identify the target device 120. In such instances, the routine 600 may determine, for example, that the target device 120 price falls within a range of possible prices. The range of prices can be based on, e.g., the values of some or each of the devices in the group of devices. The routine 600 can also determine in such instances whether the range of prices is greater than a threshold price range and, if so, determine that the target device information is not sufficient to determine a price or a sufficiently narrow range of prices to offer for the target device 120. In some embodiments, the determination can also include whether the evaluation is sufficient to identify the presence or confirm the absence of various issues. For example, if the routine 600 cannot determine from the evaluation whether the target device 120 is in a fully functional state and free of remote user control, the routine 600 can decide that the target device information is insufficient to price the target device 120. On the other hand, in some instances the value of the target device 120 may not depend on receiving additional data about the target device 120. For example, the target device 120 may be an older device that has little or no cash value regardless of its condition. In that instance, the information about the target device 120, even if not complete, is sufficient to determine a price for the target device 120.

If the routine 600 determines in block 612 that the evaluation is not sufficient to price the target device 120, then in block 614 the routine 600 prompts the user for additional information about the target device 120. For example, the app can prompt the user to answer questions about the condition of the target device 120, such as whether it has cracked glass or water damage, and/or its characteristics such as storage capacity or color. In some embodiments, the routine 600 can present a device identification interface for the user to identify the target device 120. For example, in some embodiments the app can present a hierarchy of screen displays on the evaluator device 110 for the user to identify the target device make (or brand) and model. In other embodiments, the app can prompt the user (such as by a dialog that the app can display on the screen 115 of the evaluator device 110) to provide more general and/or more specific information about the target device 120. For example, the app can ask the user to confirm the category of the target device 120 (e.g., laptop, television, smartwatch, game console, music player, wireless headset, mobile phone, virtual reality display, etc.). As another example, the app can request detailed information such as the color and/or style of the target device 120, such as information about a mobile phone produced in more than one variety or a device that could include external or interchangeable accessories (e.g., console face plates). All this information can be verified later if necessary, e.g. at one of the kiosks 300 when the user brings the target device 120 to the kiosk 300 to sell the target device 120 for the offer price.

In some embodiments, the app can prompt the user to submit an identifier of the target device 120. For example, the app can direct the user (e.g., by displaying instructional text, images, and/or video on the screen 115 of the evaluator device 110) to input a target device 120 model number, serial number, or IMEI. For example, the app can direct the user to cause a console application (e.g., Apple® iTunes®) to display information about the target device 120, and then direct the user to provide such information to the app (e.g., via copy-and-paste, cross-application messaging, a screenshot, etc.). As another example, the app can instruct the user (e.g., displaying instructional steps on the screen 115, playing audio instructions via the speaker 224, etc.) to activate the target device 120, invoke a menu system on a display of the target device 120, and navigate the target device 120 menu system to a device settings "about" page that displays information about the target device 120. The app can then direct the user to take a photograph of the displayed information with the evaluator device 110 (e.g., for a remote server to perform optical character recognition (OCR) on the photograph), to identify the target device 120. In some instances, the target device 120 may bear a printed barcode or other machine-readable indicia containing, e.g., a device model number, a serial number, and/or an identifier such as a mobile phone IMEI. For example, the manufacturer may have affixed one or more barcodes, numbers, and/or text information to the inside or outside of a back panel of the target device 120. The routine 600 can instruct the user to take a picture of the barcode using a camera 216 (or, e.g., an infrared reader, RFID reader, or other scanner or sensor) associated with the evaluator device 110. The routine 600 can then decode the barcode and/or recognize the numbers and/or text (e.g., utilizing OCR) to read the information and identify the target device 120.

In decision block 616, the routine 600 determines whether the additional information from the user has been received. If so, the routine 600 returns to block 612. If the routine 600 does not receive sufficient additional information, then the routine 600 can direct the user to bring the target device 120 to the kiosk 300 for a physical and/or electrical inspection, and the routine 600 ends.

In block 618, once the routine 600 has received sufficient information, the routine 600 determines an offer price for the target device 120 as described above with reference to block 512 of FIG. 5. In some embodiments, the routine 600 determines a fixed price for the target device 120 that is valid for a set amount of time, so that the user can bring the target device 120 to one of the kiosks 300 within the set time already knowing its value, thereby providing certainty and confidence. In some embodiments, the routine 600 determines a price range for the target device 120, and thus requiring the user to bring the target device 120 to the kiosk 300 so that the kiosk 300 can complete the evaluation of the target device 120 (e.g., including a visual inspection) and determine an offer price. In some embodiments, determining an offer price includes notifying the user (e.g., by displaying a message on the evaluator device screen 115, by sending the user a text or email message, etc.) of promotions available for recycling the target device 120, e.g., at a particular place and time. In some embodiments, determining an offer price includes estimating a future value of the target device 120, or future values projected over time. Such projections can be based on, for example, past depreciation and/or anticipated release schedules for future devices (such as new Apple® iPhone® mobile phones).

In block 620, the routine 600 presents the user an offer price for the target device 120, as described above with reference to block 514 of FIG. 5. In decision block 622, the routine 600 determines whether the user elects to recycle the target device 120 at the offer price. For example, the app can present options that the user can select to indicate the user's interest in selling the target device 120 or obtaining additional information about the recycling process, such as touchscreen 212 buttons on the display 115 of the evaluator device 110. If the user chooses not to recycle the target device 120 or get additional information about recycling the target device 120, the routine 600 ends. Conversely, if the user elects to recycle the target device 120, then in block 624, the routine 600 provides instructions to the user for recycling the target device 120. As an example, if the user selects a "Recycle now!" button displayed by the app on the evaluator device display 115, the app can provide directions to the nearest recycling kiosk 300, retailer, etc. As another example, the routine 600 can electronically send the user a voucher (to print out, or as an electronic voucher) or redemption code for the target device 120 After the user knows how much the target device 120 is worth, he or she can take it to the recycling kiosk 300 and efficiently complete a transaction to recycle the target device 120, and/or take other steps to sell the device, such as by mailing the device in to a recycler location or taking the target device 120 to a store clerk at a retail business (e.g., to trade in the target device 120 for a discount on a new device). In some embodiments, the user deposits the voucher or inputs the redemption code to sell the target device 120 for the offer price. After block 624, the routine 600 ends.

Figures 7A, 7B:
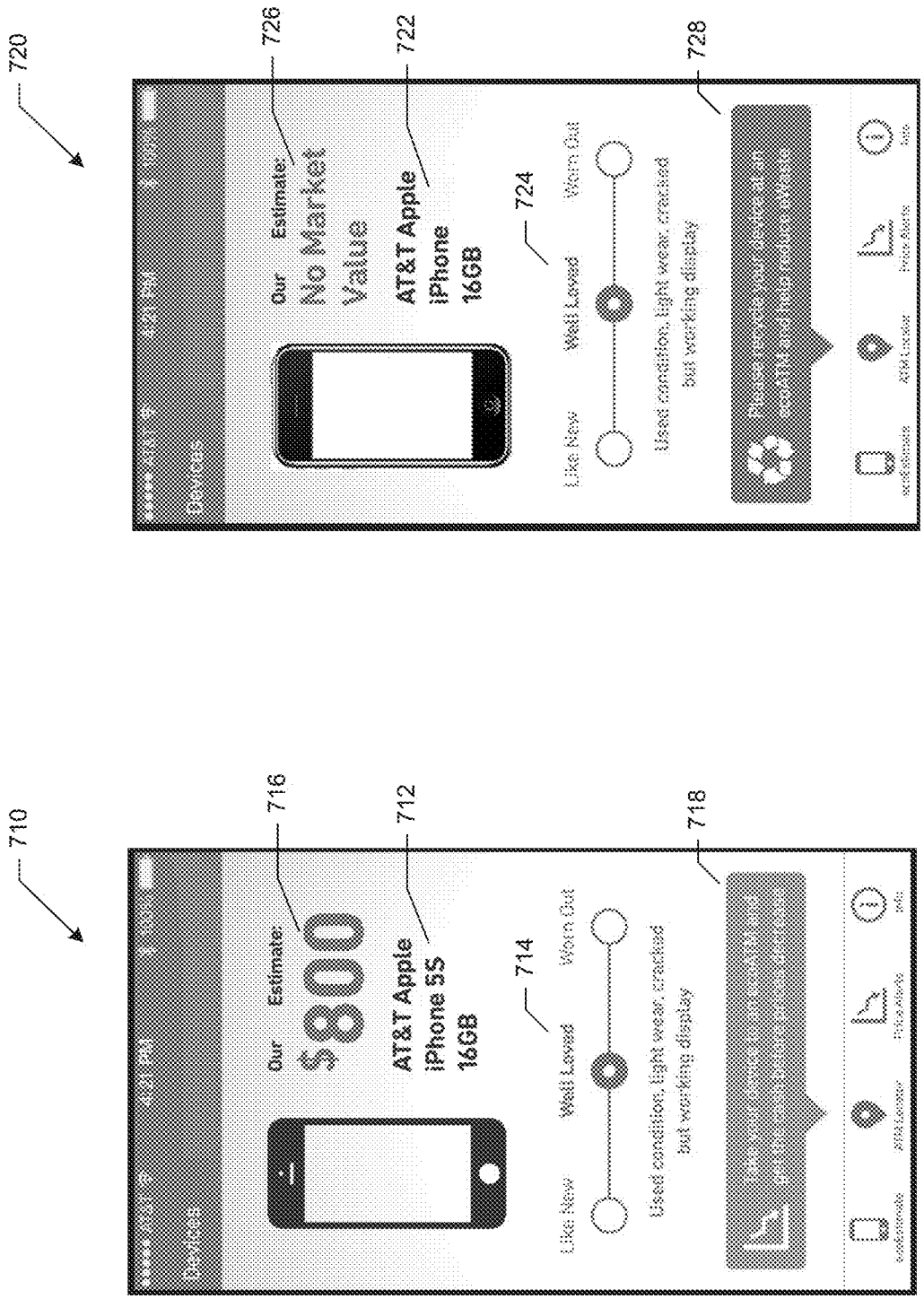
FIGS. 7A and 7B are display pages illustrating screen displays or graphical user interfaces associated with determining an offer price for a target device in accordance with embodiments of the present technology.

FIGS. 7A and 7B are display pages illustrating display pages or graphical user interfaces (GUIs) 710 and 720, respectively, associated with determining offer prices for target devices 120 in accordance with embodiments of the present technology. In some embodiments, the evaluator device (e.g., the evaluator device 110 of FIG. 1) displays the illustrated information on the display screen 115 of the evaluator device 110. Referring first to FIG. 7A, the display page 710 illustrates an estimated price or offer price for a target device 120 (e.g., a mobile phone, desktop computer, game console, video monitor, set-top box, fitness device, etc.). In the illustrated example, the app has identified the target device 120 as an Apple® iPhone® 5S mobile phone having 16 GB of memory and associated with the AT&T® mobile carrier network, as shown by the descriptive text 712. In various embodiments, the app can display similar display pages for all manner of target devices 120. The page 710 displays a condition indicator 714 characterizing the phone as "well loved," in used condition showing light wear. In the illustrated embodiment, the condition indicator 714 includes other options such as "like new" and "worn out." In other embodiments, the condition indicator 714 enables a user to select whether the target device 120 appears to be in poor, fair, or excellent condition, for example. Based on the identity 712 and condition 714 of the mobile phone, the app presents a price estimate or offer 716 of $800 for the user to sell the target device 120 at a kiosk 300. Instructions 718 prompt the user to take the target device 120 to "an ecoATM" kiosk (e.g., one of the kiosks 300) to exchange it for cash before the price changes. FIG. 7B shows a similar display page 720 that illustrates an estimated price or offer for a less valuable target device 120. The description 722 identifies the target device 120 as a mobile phone, e.g., an original Apple® iPhone® having 16 GB of memory and AT&T® as a mobile carrier. The condition indicator 724 describes the phone as "well loved," for instance, with cracked glass but a working display. Based on the identity 722 and condition 724 of the phone, the app presents an estimate that the target device 120 has no market value. Instructions 728 prompt the user to take the target device 120 to a kiosk 300 for recycling to benefit the environment.

The display pages in the present disclosure, including display pages 710 and 720, illustrate representative computer display screens or web pages that can be implemented in various ways, such as in C++ or as web pages in XML (Extensible Markup Language), HTML (HyperText Markup Language), the Wireless Access Protocol (WAP), LaTeX or PDF documents, JavaScript, or any other scripts or methods of creating displayable data, such as text, images, animations, video and audio, etc. The screens or web pages provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users are shown and described with reference to certain Figures, those skilled in the relevant art will recognize that various other alternatives may be employed. The terms "screen," "web page" and "page" are generally used interchangeably herein.

When implemented as web pages, for example, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database typically connected to a server.

In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), matrix or bit-mapped formats, animated or video formats, etc. While aspects of the invention are described herein using a networked environment, some or all features can be implemented within a single-computer environment.

Figure 8:
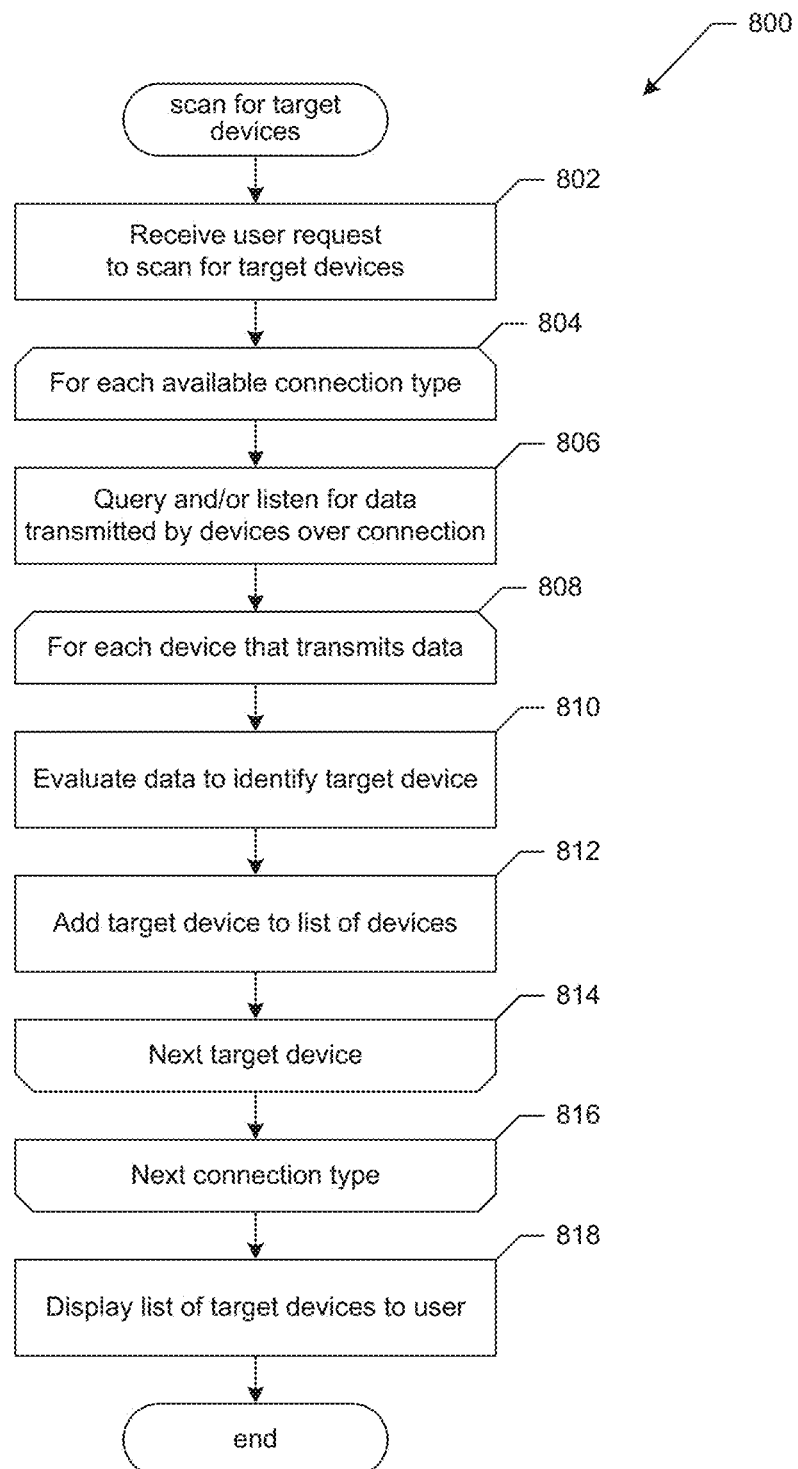
FIG. 8 is a flow diagram of a routine for scanning for target devices in accordance with embodiments of the present technology.

FIG. 8 is a flow diagram of a routine 800 for scanning for target devices 120 in accordance with embodiments of the present technology. In various embodiments, an app running on an evaluator device 110 and/or another processing device operatively connectable to the app, such as a remote server, can perform some or all of the routine 800. In some instances, for example, a user who owns various electronic devices that are connected to a wireless network may want to know how much one or more of those target devices 120 are worth, individually and/or collectively. The routine 800 of FIG. 8 enables the user to use the evaluator device 110 (e.g., the app that the user downloaded to his or her mobile phone or other electronic device, or a script associated with a page loaded in a web browser running on the user's computer or other electronic device) to scan for target devices 120, assemble a list of discovered target devices 120, and price the various target devices 120 for recycling. In some embodiments, the app can automatically perform some or all of the routine 800 without requiring the user to initiate the routine. For example, the app can discover and price a number of the user's devices and then notify the user that a list of those prices is available to view if the user wants to see them.

In block 802, the routine 800 receives a user request to scan for target devices 120. For example, the user can start the app on the evaluator device 110 and choose a displayed option to "Find My Devices!". In some embodiments, the app can allow the user to specify individual types of device connections to scan for; for example, the user may want to search for devices connected via Wi-Fi but not for devices connected via Bluetooth. In blocks 804-816, the routine 800 iterates through each available connection type, or each available connection type that the user has specified or selected. Available network connections can include, for example, wired Ethernet, Wi-Fi, USB, FireWire, Thunderbolt, Bluetooth, NFC, etc.

In block 806, the routine 800 queries the current connection type and/or listens for data transmitted by devices on that type of connection. For example, a USB host can send a request to each of the USB devices connected to that host, requesting descriptors for each device. As another example, a Wi-Fi access point can broadcast a probe request asking available devices to respond and indicate their presence. Even without broadcasting a probe request, a Wi-Fi device can monitor traffic on its network and/or channel and record information transmitted while the Wi-Fi device is monitoring that traffic.

In some embodiments, the routine 800 can obtain a list of devices attached to a network connection indirectly, such as by querying an API of a device controlling the network, or a data store cataloging the devices on the network. For example, if a USB host maintains a list of USB peripherals connected to that host, and if the evaluator device 110 has access to that list (e.g., if the evaluator device 110 is the USB host or has the ability to make API calls to the USB host), then the app can simply retrieve the contents of the list to determine all of the devices connected to the bus.

In blocks 808-814, the routine 800 iterates through each device that transmits data via the current network connection. In block 810, the routine 800 evaluates the transmitted data to identify the target device 120 that transmitted the data. For example, on a Wi-Fi or Ethernet network, the app on the evaluator device 110 can examine packets to find the MAC address of each network sender and/or recipient, and parse the MAC addresses to identify, e.g., their manufacturers. The app can also inspect packets to determine device host names, Digital Living Network Alliance (DLNA) device and/or service information, and/or HTTP headers with browser and/or device information. In various embodiments, the routine 800 can use local and/or remote database queries to identify devices based on such information. On a given Wi-Fi network, as an example, the evaluator device 110 may be able to detect Wi-Fi-enabled computers, televisions, wireless speakers, DVRs, cameras, music players, e-readers, handheld devices, appliances, printers, network attached storage devices, and the access point itself, among other electronic devices. In block 812, the routine 800 adds the detected target device 120 to a list of discovered devices. In block 814, the routine 800 proceeds to the next detected device. In block 816, after evaluating the transmitted data to identify each target device 120 attached to the current network, the routine 800 proceeds to the next network connection type, e.g., after identifying USB bus devices, the routine 800 may proceed to discover and identify Ethernet network devices.

In block 818, after iterating through each of the available connection types, the routine 800 displays a list of discovered target devices 120. For example, the app can display the list of devices, such as the list illustrated in FIG. 9, on the screen 115 of the evaluator device 110. The routine 800 can automatically add each discovered target device 120 to an inventory of the user's devices, and/or allow the user to select particular target devices 120 for storing in inventory or recycling. In some embodiments, the evaluator device 110 can price some or all of the discovered devices, automatically or at the user's request. For example, the app on the evaluator device 110 can follow the prices of the target devices 120, provide value updates and/or deal updates to the user, and/or help the user manage the lifecycle of the target device 120 and others in an electronics portfolio maintained by the routine 800. After block 818, the routine 800 ends.

Figure 9:
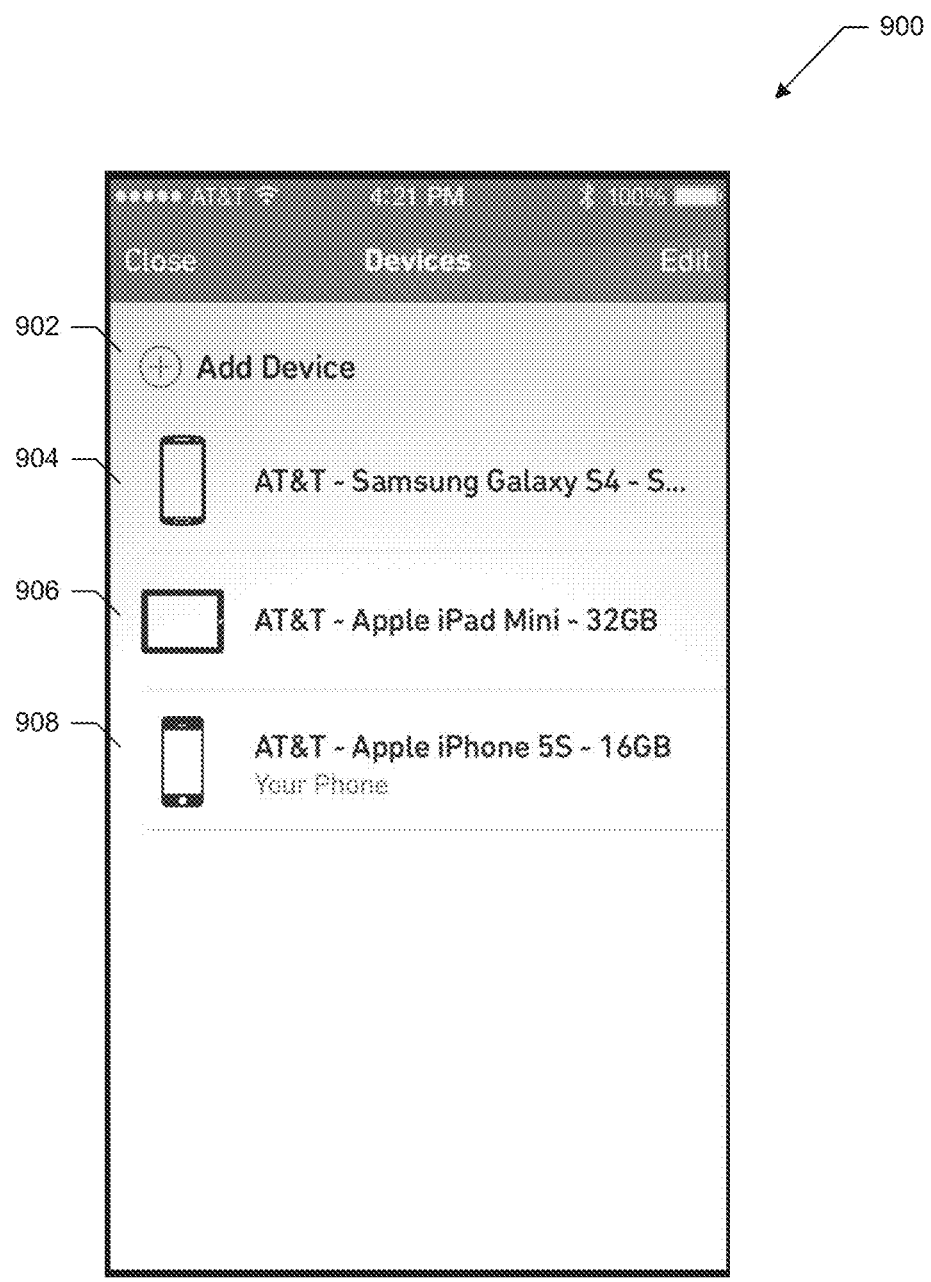
FIG. 9 illustrates a display page associated with a list of target devices in accordance with embodiments of the present technology.

FIG. 9 illustrates a screen display page 900 associated with a list of target devices 120 in accordance with embodiments of the present technology. In some embodiments, the evaluator device 110 displays the illustrated information on the display screen 115 of the evaluator device 110. For example, a user may have several devices that he or she is considering recycling. The app can enable the user to manage various target devices 120 for recycling.

The display page 900 depicts a list of target devices 120 for potential recycling, including mobile phones 904 and 908, and a tablet 906. By way of example only, in the illustrated embodiment, the app is running on the mobile phone 908, which is indicated to be "Your Phone" by associated text. If the target device 120 that the user wishes to recycle is not listed, then the plus icon 902 enables the user to add another device to the list of target devices 120 as described above. By enabling the user to add multiple target devices 120 to be priced for recycling, the app provides flexibility and convenience for the user: the user can manage his or her various devices (e.g., tracking their value over time), decide which devices to recycle and when to recycle them, and bring multiple devices to the kiosk 300 at once for recycling. In some embodiments, the app displays individual values of target devices 120 and/or aggregate information about the value of the devices in the user's list of target devices 120 for potential recycling.

Figure 10:
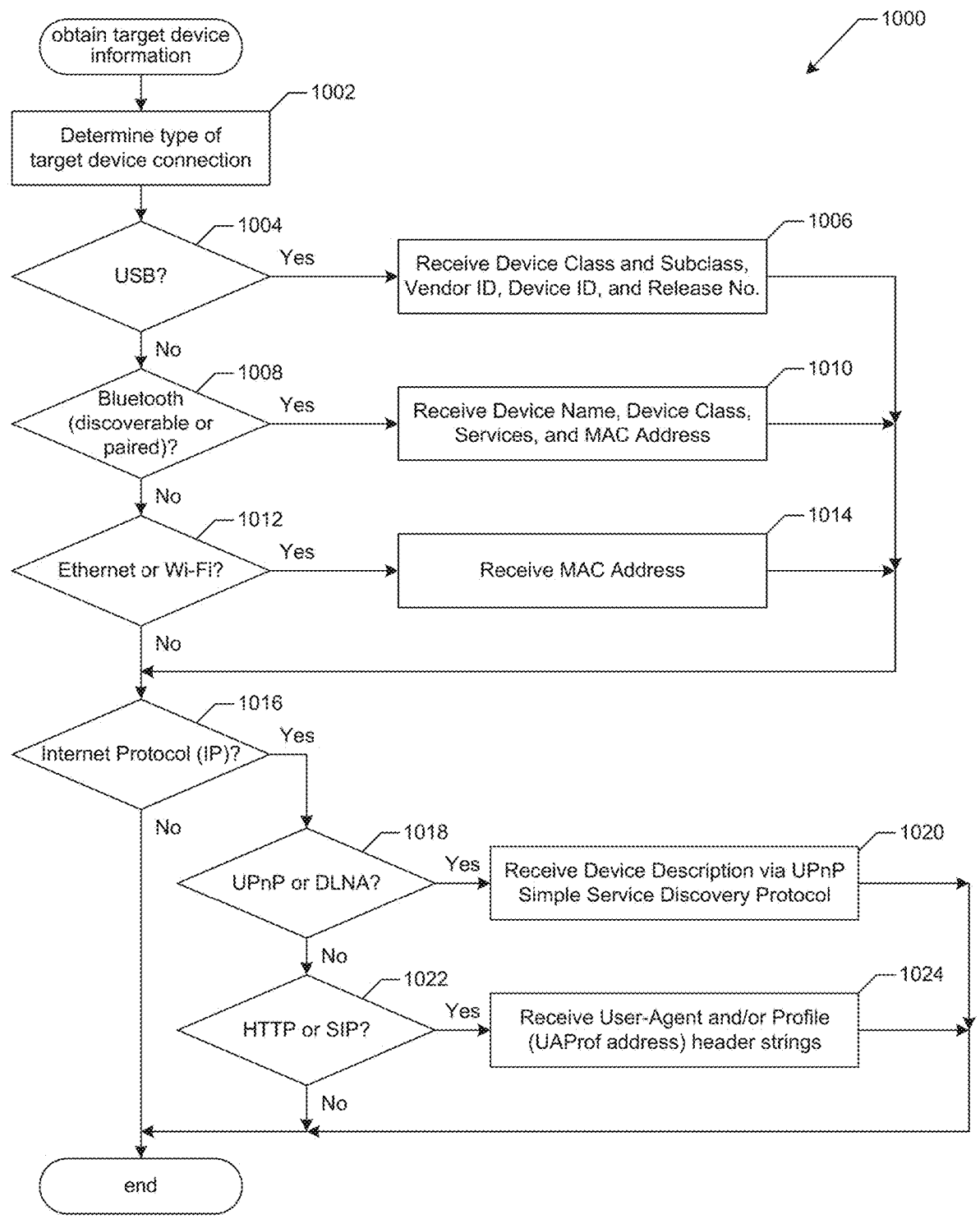
FIG. 10 is a flow diagram of a routine for obtaining target device information in accordance with embodiments of the present technology.

FIG. 10 is a flow diagram of a routine 1000 for obtaining target device information in accordance with embodiments of the present technology. In various embodiments, an app running on an evaluator device (e.g., the evaluator device 110 of FIG. 1) can perform some or all of the routine 1000. For example, as described above with reference to FIG. 8, the app can iterate through various types of network connections and obtain information about devices on each network type. The routine 1000 of FIG. 10 describes different types of information that can be received from devices on a given network.

In block 1002, the routine 1000 determines the type of connection between the evaluator device 110 and the target device 120. In some instances, the app on the evaluator device 110 can receive a notification when a target device 120 is attached to the evaluator device 110 via a particular type of connection (e.g., USB, Wi-Fi, etc.), as described above with reference to FIG. 5. In other instances, the app can scan several different types of connections and catalog target devices 120 associated with each type, as described above with reference to FIG. 8. The connection type can include multiple aspects or layers. For example, network information can relate to the basic data link used to address the devices, and/or higher-level networking protocols, services, and/or applications. For example, the evaluator device 110 can obtain a target device hardware address specific to a particular type of network connection (e.g., a MAC address for an Ethernet port) as well as information about the target device 120 transmitted via protocols such at HTTP (for World Wide Web traffic). In various embodiments, the app on the evaluator device 110 can determine information about the connection at multiple levels.

By way of illustration, in decision block 1004, the routine 1000 determines whether the connection is a USB connection. If so, then the routine 1000 proceeds to block 1006. In block 1006, the routine 1000 can receive USB target device information including, for example, the USB device class and subclass category numbers, vendor ID number, device ID number, release number, etc. If the connection is not a USB connection, then the routine 1000 proceeds to decision block 1008 to determine whether the connection is a Bluetooth connection. If so, then the routine 1000 proceeds to block 1010. In block 1010, the routine 1000 can receive Bluetooth target device information including, for example, the Bluetooth device name, device class, service class or classes, Bluetooth MAC address, etc. If the connection is not a Bluetooth connection, then the routine 1000 proceeds to decision block 1012 to determine whether the connection is an Ethernet or Wi-Fi connection. If so, then the routine 1000 proceeds to block 1014. In block 1014, the routine 1000 can receive target device information including, for example, the device Ethernet or Wi-Fi MAC address, etc. In various embodiments, the routine 1000 can include additional types of connections and associated types of information that can be received from target devices 120 via those additional connection types.

After receiving target device information as described above, the routine 1000 proceeds to decision block 1016 and determines whether the target device 120 communicates via, for example, Internet Protocol (IP). IP communications (packets) can be transmitted over various lower level communication network types. IP packets themselves can carry higher level host-to-host and application data. Thus, for example, if the target device 120 communicates via IP, then in decision block 1018, the routine 1000 determines whether the target device 120 transmits Universal Plug and Play (UPnP) or Digital Living Network Alliance (DLNA) data. If so, then in block 1020, the routine 1000 can receive the device description of the target device 120 via the UPnP simple service discovery protocol (SSDP). Alternatively, in decision block 1022, if the target device IP communications contain HyperText Transfer Protocol (HTTP) traffic (e.g., Web page requests) and/or Session Initiation Protocol (SIP) traffic (e.g., Internet telephony data), then in block 1024, the routine 1000 can receive User-Agent and/or Profile (UAProf address) header strings from the target device 120. In various embodiments, the routine 1000 can include additional protocols and associated types of information that can be received from target devices 120 via those additional protocols. After receiving information about the target device 120 via its network connection type and/or network communication protocols, the routine 1000 ends.

FIG. 11 is a flow diagram of a routine 1100 for photographically identifying a target device 120 in accordance with embodiments of the present technology. In various embodiments, an app running on an evaluator device (e.g., the evaluator device 110 of FIG. 1) and/or another processing device operatively connectable to the app, such as a remote server, can perform some or all of the routine 1100. In some instances, for example, a user may have a target device 120 that the user does not know how to identify (e.g., a target device 120 that will not power on). In some embodiments, the app can utilize input from a camera, RFID reader, infrared scanner, or other scanner or sensor to identify the target device 120. The routine 1100 of FIG. 11 enables the user to use a camera associated with the evaluator device 110 to photograph the target device 120 and then use the app to identify the target device 120 based on the photographs.

In block 1102, the routine 1100 receives information about the evaluator device 110. For example, various electronic devices such as mobile phones, tablet computers, and laptop computers include built-in cameras and/or camera attachments, and computers of various types may be connected to external cameras such as USB or wireless webcams. The routine 1100 can receive information about whether the evaluator device 110 includes such a still or video camera 216. The routine 1100 can also receive information about, for example, specifications regarding the capabilities of the camera 216 (e.g., its resolution, minimum focusing distance, etc.) and/or information about whether the app on the evaluator device 110 has permission to operate the camera 216 and/or access photographs taken by the camera 216).

In decision block 1104, the routine 1100 determines whether the evaluator device 110 has access to a camera 216. In some embodiments, the app running on the evaluator device 110 can query an operating system 242 API to obtain information about whether a camera 216 is associated with the evaluator device 110 and/or available to the app. For example, the Android™ operating system 242 provides, via its android.hardware.camera2 software package, a CameraManager class for detecting, characterizing, and connecting to CameraDevice class objects that represent cameras connected to the Android™ evaluator device 110. The app can, for example, call the CameraManager getCameraIdList( ) method to obtain an identifier for each attached camera; and then call the getCameraCharacteristics( ) method to obtain properties of a particular camera (e.g., the direction the lens faces, the sensor sensitivity range, whether optical image stabilization is available, etc.). In some embodiments, the routine 1100 can also determine whether the camera 216 is of sufficient quality to enable the routine 1100 to identify the target device 120 using photographs taken by the camera 216. In other embodiments, the routine 1100 enables the user to submit photographs taken by the user using a high-quality digital camera not directly connected to the evaluator device 110. The routine 1100 can require, in such instances, that the submitted photographs contain image metadata (such as Exchangeable image file format (Exif) data) indicating that the submitted photographs are real, recent digital photos taken by the user and not, e.g., manufacturer product advertising images. If the evaluator device 110 does not have access to a camera 216, then the routine 1100 ends.

If the evaluator device 110 does have access to a camera 216, then in block 1106 the routine 1100 directs the user to photograph the target device 120 using the camera 216. For example, the app can display instructions on the display screen 115 of the evaluator device 110 that instruct the user to take photos of the target device exterior from various angles or perspectives. For example, the routine 1100 can instruct the user to take a series of photographs of the target device 120 in various orientations or from various angles (and may instruct the user to take a picture of the target device 120 in a mirror if the target device 120 is the evaluator device 110). The routine 1100 can also instruct the user to scan or photograph markings on the target device 120, such as a brand name, product name, product code number, FCC or UL ID number, patent numbers, product barcode, other machine-readable indicia, etc. In some instances, the routine 1100 can instruct the user to take photographs in specific lighting conditions, and/or detect the ambient lighting conditions using the camera 216 (and, for example, request better lighting if the target device 120 is insufficiently lit).

In block 1108, the routine 1100 receives photographs of the target device 120 taken by the camera 216. In some embodiments, the app controls the camera 216, such as automatically taking a photograph when an object is detected. In other embodiments, the routine 1100 allows the user to upload photos taken with a separate camera. In block 1110, the routine 1100 evaluates the photographs of the target device 120. In some embodiments, the app transmits the photos from the evaluator device 110 to a remote server computer, such as the server computer 404 and/or the cloud computing resources 426 of FIG. 4, to perform visual analysis of the photographs. For example, the evaluation can include identifying features of the target device 120, such as shapes corresponding to exterior features of the device. The evaluation can also detect whether a photograph includes text (including, e.g., numbers and/or machine-readable codes) such as markings on the target device 120. The routine 1100 can then perform optical character recognition (OCR) and/or compare characteristics of the text (e.g., layout, size, font, color, etc.) to templates to determine whether the photograph includes device identifiers such as a model number, serial number, etc. OCR can be performed by the app on the evaluator device 110 and/or remotely, such as by a distributed computing system. In some embodiments, the visual analysis of the photographs can include transmitting the photographs to a remote workstation for evaluation by a human operator for identification, inspection, and/or grading of the target device 120. For example, the routine 1100 can transmit a photograph of the screen of the target device 120 to a verification facility operated by the kiosk operator 432 including a computing workstation configured to process target device screen images (e.g., to detect features indicative of a cracked screen) and to display the photograph to a reviewer who can evaluate the photograph of the target device 120.

In block 1112, the routine 1100 identifies the target device 120 based on the evaluation of the photographs of the target device 120. For example, the routine 1100 can identify the target device 120 based on a visual analysis of the shapes, proportions, and/or distinctive features of the target device 120. The identification can also be based on decoding markings on the device; for example, using a vendor name marked on the front of the device and a model code number printed on the back of the device, the routine 1100 can search a database of electronic devices by manufacturer (e.g., on the evaluator device 110 and/or a remote server) to identify the target device 120. The visual analysis can also verify the color of the device, identify potential issues such as a cracked screen or other broken or missing components, etc. After block 1112, the routine 1100 ends.

FIG. 12 is a flow diagram of a routine 1200 for analyzing information displayed by a target device 120 in accordance with embodiments of the present technology. In various embodiments, an app running on an evaluator device (e.g., the evaluator device 110 of FIG. 1) and/or another processing device operatively connectable to the app, such as a remote server, can perform some or all of the routine 1200. The routine 1200 may be implemented in some embodiments, for example, where a target device 120 is capable of displaying information about itself, but not capable of transmitting such information to the evaluator device 110. For example, when the user does not have a cable (or wireless facilities) for connecting the evaluator device 110 to the target device 120, such embodiments may be advantageous. The routine 1200 of FIG. 12 enables the user to use a camera 216 associated with the evaluator device 110 to photograph the information displayed by the target device 120 and identify and/or assess the target device 120 based on the photographs.

In block 1202, the routine 1200 provides instructions for the target device 120 to display a pattern, a code, or other information about the target device 120. For example, in some embodiments, the app can display instructions on the screen 115 of the evaluator device 110 that direct the user to cause the target device 120 to display an "about" screen, a setup and configuration screen, and/or other information about the target device 120 on the display screen of the target device 120. As another example, the app can send a visual code to the target device 120 or send a control signal to the target device 120 prompting the target device 120 to display a test pattern. If the target device 120 is also running an instance of the app or a counterpart app, then the evaluator device 110 can trigger the app on the target device 120 to display a visual pattern, a code, or other information, e.g., information about the target device 120, in a known format.

In block 1204, the routine 1200 directs the user to photograph the image on the target device 120 display screen, e.g., using a camera 216 associated with the evaluator device 110. For example, the app can instruct the user by displaying instructions on the screen 115 of the evaluator device 110. In some embodiments, information may be printed on the target device 120 (e.g., the back of the device), and the routine 1200 directs the user to photograph an appropriate portion of the target device 120 (e.g., the back of the device). In block 1206, after receiving a photograph of the image displayed on the display of the target device 120, the routine 1200 evaluates the display based on the photograph. For example, the routine 1200 can identify lines in the photograph characteristic of cracked display glass. The routine 1200 can also identify portions of the display that are not properly illuminated (e.g., portions that appear black or in the wrong color, indicating inoperative pixels).

In block 1208, the routine 1200 analyzes the pattern, code, or other information in the photograph of the target device 120 (e.g., the display or the back of the device), such as described above with reference to block 1112 of FIG. 11. In some embodiments, the routine 1200 expects a particular pattern, code, or information to be displayed according to the instructions described above (e.g., a QR code, a particular screen test pattern, an "about" screen with labeled information, etc.). By tailoring the visual analysis based on characteristic features specific to the expected pattern, code, or other information (e.g., position and alignment blocks for QR codes, or word and/or character shapes for text), the routine 1200 can simplify and speed recognition of the displayed pattern, code, or other information. In other embodiments, the routine 1200 can perform visual feature analysis and/or OCR to identify patterns, codes, and/or text in the photographed screen whether or not the photograph contains expected features. Such visual analysis and/or OCR can be performed by the app and/or remotely, such as by the server computer 404 and/or using the cloud computing resources 426. For example, the routine 1200 can decode a QR code, barcode, or other visual pattern or code to extract the coded information. As another example, the routine 1200 can analyze text recognized via OCR to obtain identifiers (e.g., a device model number, an IMEI number, etc.) and/or other information about the target device 120.

In block 1210, the routine 1200 identifies the target device 120 and/or assesses the target device condition based on the evaluation of the target device display and/or the analysis of the displayed pattern, code, and/or information. For example, using a model code number displayed on an "about" screen, the routine 1100 can search a database of electronic devices by model (e.g., a database stored on the evaluator device 110 and/or a remote server) to identify the target device 120. As another example, by identifying information displayed on the screen of the target device 120, the routine 1200 can determine that the screen of the target device is able to properly display that information. By contrast, if a portion of the pattern, code, or other information is missing, the routine 1200 can determine that the corresponding portion of the display of the target device 120 has malfunctioned. After block 1210, the routine 1200 ends.

Figure 13:
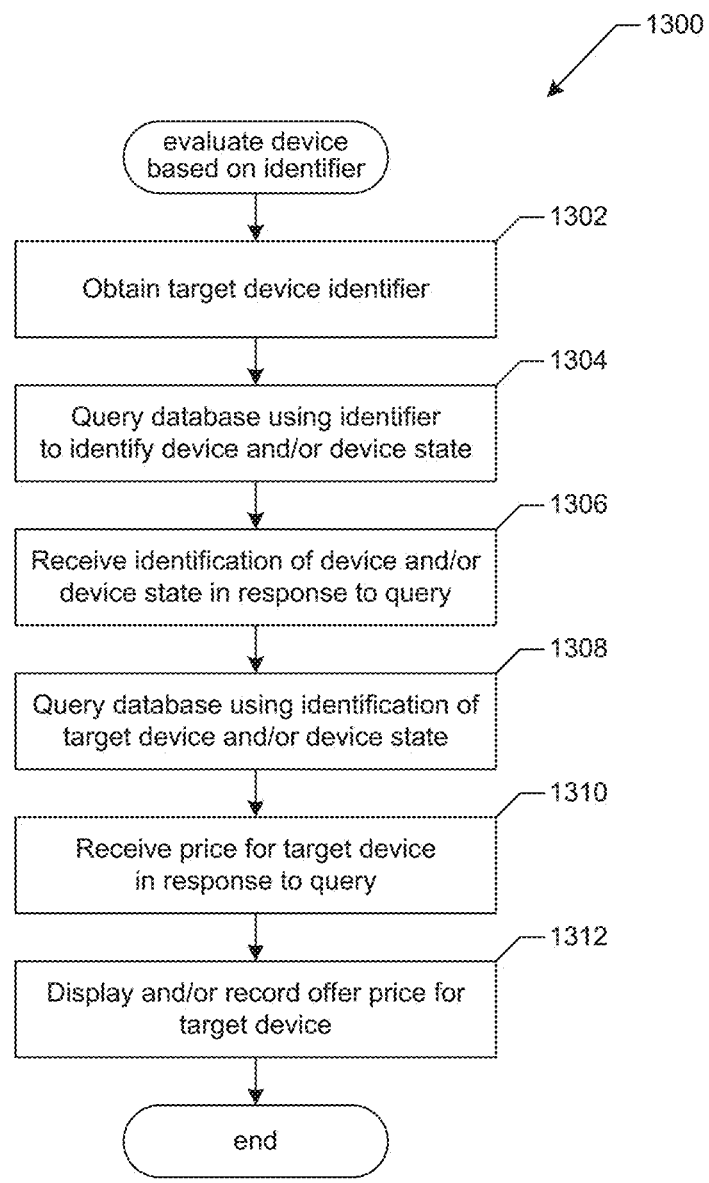
FIG. 13 is a flow diagram of a routine for identifying and pricing a target device for recycling in accordance with embodiments of the present technology.

FIG. 13 is a flow diagram of a routine 1300 for identifying and pricing a target device 120 for recycling in accordance with embodiments of the present technology. In various embodiments, an app running on an evaluator device (e.g., the evaluator device 110 of FIG. 1) and/or another processing device operatively connectable to the app, such as a remote server, can perform some or all of the routine 1300. In some embodiments, the routine 1300 can be performed when the user directs the app to price the target device 120 for possible recycling, causing the app to obtain information about the target device 120 (e.g., an identifier of the target device 120). The routine 1300 enables the app and/or a remote processing device to identify the target device 120 and determine an offer price for the target device 120 based on the identification of the target device 120.

In block 1302, the routine 1300 obtains an identifier of the target device 120. Examples of target device 120 identifiers include the IMEI of a mobile phone, the model and/or serial numbers of a laptop computer, a unique wireless identifier of the target device 120 such as a Wi-Fi interface media access control address (MAC address), a product bar code, USB vendor ID and device ID (and release number) codes, etc. The app running on the evaluator device 110 can obtain the identifier from the target device 120 using one or more of the routines described above with reference to, e.g., FIGS. 5 and 6 (electrically interrogating the target device), and/or FIGS. 11 and 12 (photographing the target device).

In block 1304, the routine 1300 queries one or more databases using the identifier to identify the target device 120 and/or the state of the target device 120. For example, the app can construct a database query string based on information such as the model number, serial number, and/or IMEI of the target device 120 obtained by the electrical interrogation and/or visual analysis of the target device 120. The app can use one or more local and/or remote databases, such as a locally stored lookup table included in or associated with the app on the evaluator device 110 and/or a remotely hosted database or service for responding to queries. The local and/or remote database can be a data structure indexed against device identifiers and/or configured to identify popular devices and/or target devices 120 that the user has previously used or indicated owning. In some embodiments, for example, the app contains a database of several popular electronic devices. The app can compare the information about the target device 120 to the information in the local database to determine whether the target device 120 is one of the several popular devices. If no match is found, the app can transmit a query to a remote server for comparison against a database of a larger number of devices.

In block 1306, the routine 1300 receives information identifying the target device 120 and/or the state of the target device 120 in response to the querying described above. For example, the app can receive an identification of the device maker, model designation, known features and/or characteristics, options and/or additional target device-specific information to prompt the user for, etc. in response to a query that includes the target device model number. The information can be received in a format or data structure that the app is configured to recognize and/or parse. The app can also communicate with remote servers and/or services such as the GSMA IMEI Database (e.g., for parsing mobile phone IMEI numbers), a database of stolen devices (e.g., including device identifiers associated with police reports), and/or a service configured to provide data about whether an electronic device is associated with a remote user account (e.g., Apple® GSX servers or the icloud.com/activationlock/ "Check Activation Lock Status" web-based service for iCloud® accounts). Using the responses from such local and/or remote databases, the routine 1300 can determine the identity of the target device 120 (e.g., its make and model) and determine whether the target device 120 is in an acceptable state for processing at the kiosk 300 (e.g., determining whether the target device 120 is subject to remote user control such as remote tracking, locking, data erasure ("wiping"), and/or disabling (a "kill switch"), which would need to be disabled before recycling the target device).

In block 1308, the routine 1300 queries a pricing database using the identification of the target device 120 and/or the state of the target device 120. In various embodiments, the app or a remote server can query a local or remote database (e.g., the database 406) using the target device information. For example, after the app receives a standardized identification of the target device 120 (e.g., a particular model name and/or number), the routine 1300 can search a local and/or remote data structure that maps the standardized identification information to pricing information for the target device 120. For example, as described above with reference to FIG.

5, the app on the evaluator device 110 can download pricing data from a remote server (e.g., the server computer 404 of FIG. 4), such as a lookup table, pricing model, or other data structure containing prices for popular electronic devices, and look up the target device make and model in that downloaded data and/or in a remote database (e.g., the database 406). In some embodiments, the app on the evaluator device 110 can submit a query that includes information about the state and/or condition of the target device 120, to obtain a more accurate price for the target device 120.

In block 1310, the routine 1300 receives an offer price for the target device 120 in response to the query. In some instances, the price includes a range of prices or a price that is contingent on the user bringing the target device 120 to a kiosk 300 or retailer, etc. for verification and/or further evaluation. In some embodiments, the user must bring the target device 120 to the kiosk 300, retailer, etc. within a preset time period, e.g., ten days. In block 1312, the routine 1300 displays and/or records the offer price for the target device 120. For example, the routine 1300 can present the offer price to the user via the display screen 115 of the evaluator device 110, and/or send the user an electronic message conveying the offer price for the target device 120. In addition or instead, the evaluator device 110 app and/or the remote server can store the price in a lookup table indexed against a native or assigned identifier of the target device 120. The routine 1300 can record the offer price for the target device 120 locally on the evaluator device 110 (e.g., as data 246 in memory 240) and/or remotely (e.g., together with the information about the target device). For example, the app can store a record of the price for the target device 120 and timestamp of the price, and/or can transmit the price data to the kiosk operator 432, to the remote server 404, to the cloud storage facility 426, and/or to one or more kiosks 300 (e.g., kiosks 300a-300n that are in the same geographic area as the user or the app), so that any kiosk 300 can retrieve the target device 120 price from a server and purchase the target device 120 based on the determined price. After storing the price for the target device 120, the routine 1300 ends.

Figure 14:
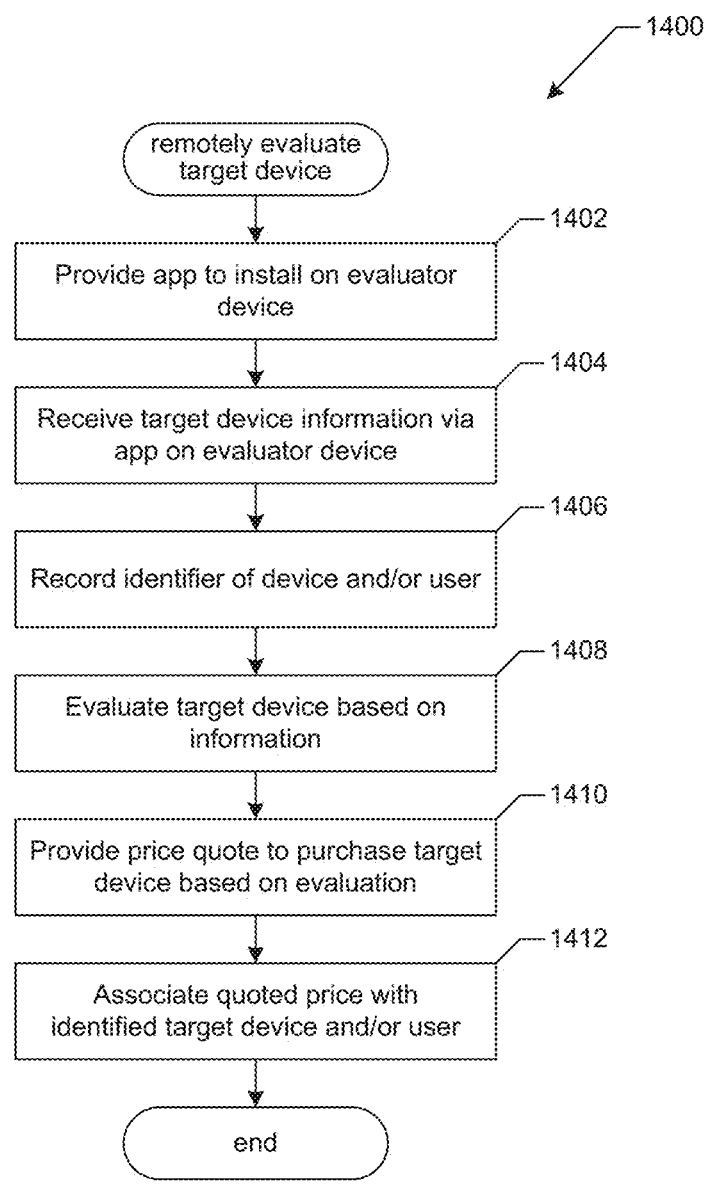
FIG. 14 is a flow diagram of a routine for remotely evaluating an electronic device for recycling in accordance with embodiments of the present technology.

FIG. 14 is a flow diagram of a routine 1400 for remotely evaluating a target device 120 for recycling in accordance with embodiments of the present technology. In various embodiments, the kiosk 300 and/or another processing device operatively connectable to the kiosk 300, such as a remote server, can perform some or all of the routine 1800. In some embodiments, the routine 1400 can be performed in conjunction with the routine 500 of FIG. 5 or the routine 600 of FIG. 6 performed by the evaluator device 110, which can be remote from the kiosk 300. For example, the kiosk 300 and/or a remote server can provide software (e.g., the app described above) to be installed on the evaluator device 110, and then the kiosk and/or server can remotely receive information about the target device 120 via the app installed on the evaluator device 110, use the information to provide an offer price for the target device 120, and record the offer price so that the user can recycle the target device 120 for the quoted offer price when the user brings the target device 120 to the kiosk 300.

In block 1402, the routine 1400 provides the app described above to install on the evaluator device 110. The routine 1400 can provide the app to the evaluator device 110 by various avenues: for example, from the kiosk 300 (e.g., sideloading the app over a wired or wireless data connection), through a website (e.g., in the form of a script executed in a browser application via a website associated with the kiosk operator 432, and/or as a download to the evaluator device 110 from the website), from a software repository run by the device manufacturer 424 or a third party (e.g., the Apple® App Store℠, Google Play™ store, Amazon® Appstore™, etc.), via a removable memory device such as an SD flash card or USB drive, by preinstallation on the evaluator device 110 by the device manufacturer 424, a wireless service carrier 422, or a device vendor, and so on.

In block 1404, the routine 1400 receives information about the target device 120 and/or the user via the app on the evaluator device 110. The information can include, for example, a device identifier such as a serial number, IMEI number, or hardware address; a device make and/or model name, number, or code; data describing the device configuration, characteristics, and/or capabilities; owner information, such as a name, driver license number, and/or account identifier; etc. For example, the user may download and run the app on the evaluator device 110 to obtain such information about the target device 120, and the app can store information about the target device 120, and/or transmit the information, e.g., to a remote server computer 404 as described above with reference to FIG. 5, FIG. 6, and FIG. 13. In various embodiments, the routine 1400 can access the stored or transmitted information, such as by receiving the information at the server computer 404.

In block 1406, the routine 1400 records one or more identifiers of the target device 120 (and/or the evaluator device 110) and/or the user. In some embodiments, the routine 1400 utilizes an identifier associated with the target device 120 that was included in the information that the routine 1400 received in block 1404. Examples of such target device 120 identifiers include the IMEI of a mobile phone, the model and/or serial numbers of a laptop computer, a unique wireless identifier of the target device 120 such as a Wi-Fi interface media access control address (MAC address), a product bar code, USB vendor ID and device ID (and release number) codes, etc. The identifier can also be a derived code such as a unique hash (based on, e.g., the information received in block 1404), and/or a serially or randomly assigned code such as by generating a globally unique identifier (GUID) for the target device 120 and/or user. In some embodiments, the routine 1400 can generate an identifier after pricing the target device 120, so that the identifier reflects the pricing. User-related identifiers can include, for example, a driver license number, account credentials such as a username and password, etc. The routine 1400 can record the identifiers in a registry database that indexes identifiers against, for example, evaluator devices 110 to which the app has been installed, target devices 120 that the system has priced (e.g., remotely via the app), and/or target devices 120 that the kiosk 300 has previously evaluated, for example. The database can be, for example, one or more of the databases 406 associated with the server computer 404 (FIG. 4), can be stored in the cloud storage facility 426, can be distributed among the kiosks 300, and so on.

In block 1408, the routine 1400 evaluates the target device 120 based on the information. For example, the routine 1400 can compare the received target device information to a database of prices, such as a lookup table, pricing model, or other data structure containing prices for various electronic devices on a server that can be remotely located from the evaluator device 110 and/or the target device 120 (e.g., the server computer 404). The routine 1400 can, for example, use the identifier to determine the make and model of the target device 120, and use the make and model of the target device 120 (along with, e.g., information about the condition of the target device) to determine a price to offer for the device based on the data in the database or pricing model. In some embodiments, the routine 1400 can determine an offer price that enables the user to receive the price in exchange for recycling the target device 120 at the kiosk 300. In some embodiments, the routine 1400 can determine an offer price for the target device 120 that is contingent on an assessment of the visual condition of the target device 120 by the evaluator device 110 (such as described above with reference to FIG. 11) or by the kiosk 300. In some embodiments, the routine 1400 can determine an offer price that includes a range of prices based on the possible outcomes of such an assessment. In some instances, the target device 120 may have no market value. In various embodiments, the pricing data is updated on a continuous or periodic basis.

In block 1410, the routine 1400 sends an offer price quote for the target device 120 to the evaluator device 110. In some embodiments, the routine 1400 sends the offer price quote from the server to the app running on the evaluator device 110. In block 1412, the routine 1400 associates the quoted price with the identified target device 120 (and/or the evaluator device 110) and/or the user. For example, the routine 1400 can store information about the price quote, the target device 120, and/or the user in the database 406 and/or in one or more data structures maintained by the app on the evaluator device 110, by the kiosk 300, and/or by other aspects of the present technology. In some embodiments, the routine 1400 can associate the price with a unique identifier such as a hash value generated based on the user, the device identification, the app, and/or the time and amount of the price itself, etc. For example, the routine 1400 can associate a numeric or alphanumeric identifier code with the offer price for the target device 120 and give that code to the user, informing the user that the user can enter the code at the kiosk 300 by a certain time to receive the offer price for the device. For example, the routine 500 can display the code on the screen 115 of the evaluator device 110, and/or send the user an email or text message containing the code. The routine 500 can store the price and the identifier in a data structure on the evaluator device 110 (e.g., in a table maintained by the app) and/or remotely from the evaluator device 110 (e.g., in a data structure maintained at one or more of the kiosk 300, the server computer 404, the cloud storage facility 426, etc.), and can transmit them between or among various computing and/or storage facilities. In some embodiments, the routine 500 transmits the identifier to the server computer 404 so that when the kiosk 300 receives the identifier, the kiosk 300 can look up the identifier and retrieve the associated price for the target device 120. After block 1412, the routine 1400 ends.

Figure 15:
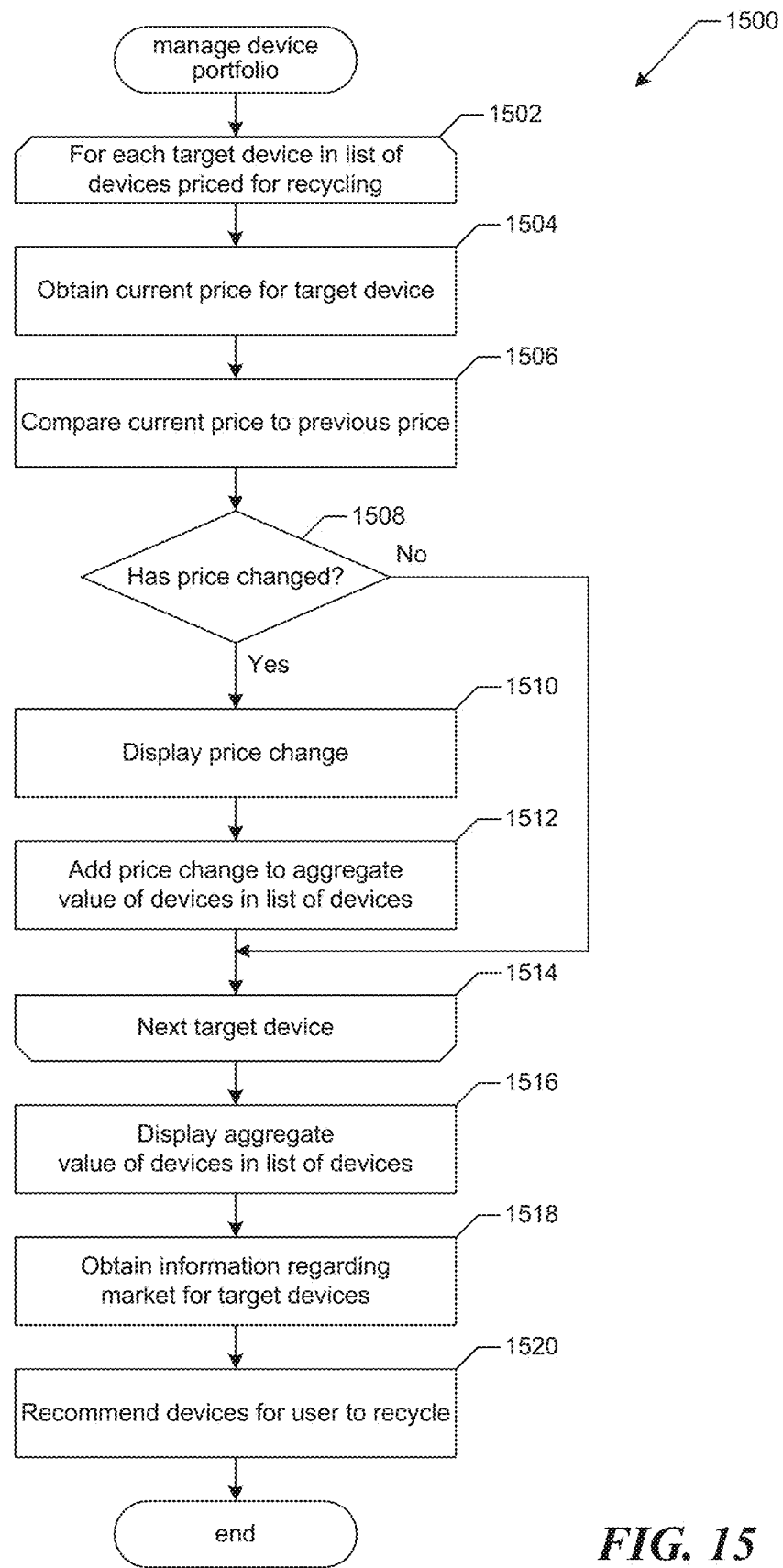
FIG. 15 is a flow diagram of a routine for managing a portfolio of devices for recycling in accordance with embodiments of the present technology.

FIG. 15 is a flow diagram of a routine 1500 for managing a portfolio of devices for recycling in accordance with embodiments of the present technology. In various embodiments, the app on the evaluator device (e.g., the evaluator device 110 of FIG. 1) and/or another processing device operatively connectable to the app, such as a remote server, can perform some or all of the routine 1500. In various instances, for example, a user may have several devices that he or she is considering recycling. The app can enable the user to manage various target devices 120 for recycling and provide recommendations for the user to recycle target devices 120.

In blocks 1502-1514, the routine 1500 iterates through a list of the user's target devices 120 for recycling (e.g., the list of devices 900 illustrated in FIG. 9), selecting each target device 120 that the user has not recycled. As another example, the app can select the evaluator device 110 on which the app is running. The routine 1500 can contact a remote server to verify whether the user has recycled a listed target device 120.

In block 1504, the routine 1500 obtains a current price for the target device 120. For example, the routine 1500 can price the device as described above with reference to FIG. 5 and FIG. 6. In some embodiments, the app on the evaluator device 110 can query a local and/or remote pricing service or data structure to update a previously determined price for the target device 120 based on the previously received data about the target device 120. In block 1506, the routine 1500 compares the current price for the target device 120 to a previous price for the target device 120. For example, the routine 1500 can compare the current price to the immediately previous price, to the most recent price checked by the user of the evaluator device 110, and/or to the first price that the user obtained for the target device 120 via the evaluator device 110. In various embodiments, the app or a server computer (e.g., the server computer 404 of FIG. 4) can retrieve a previously determined offer price for the target device 120. In some embodiments, the routine 1500 uploads data about electronic device prices to the app (e.g., on a periodic basis, such as daily) and the app checks for changes in prices for electronic devices about which the app has obtained information, such as the target devices 120 in the user's list of devices for recycling.

In decision block 1508, if the price is unchanged, then the routine 1500 proceeds to block 1514. On the other hand, if the current price for the target device 120 has changed from a previous price, then in block 1510, the routine 1500 notifies the user of the change in price, e.g., by displaying an indication of the price change on the screen 115 of the evaluator device 110. For example, in a list of target devices 120 such as the list 900 illustrated in FIG. 9, the app on the evaluator device 110 can display an indication of the current price for each target device 120 and an arrow showing whether the price has risen or fallen. In block 1512, the routine 1500 updates the aggregate value of the devices in the user's list of target devices 120 by adding in the price change for the current target device 120 (whether an increase or decrease in price). In block 1514, the routine 1500 proceeds to the next target device 120. After iterating through each of the target devices in the user's list of target devices 120, the routine 1500 proceeds to block 1516.

In block 1516, the routine 1500 displays the aggregate value of the user's target devices 120, such as on the display screen 115 of the evaluator device 110. In some embodiments, the routine 1500 can track and aggregate information about prices offered for each target device 120 and for all priced target devices 120 over time, such as via a graph display. The graph display can illustrate, for example, the date and amount of each offer for a target device 120 as well as the date and amount for which each target device 120 is actually recycled. In some embodiments, displaying an aggregate price of the user's target devices 120 for recycling includes projecting a future value of individual target devices 120 and/or the aggregated portfolio of the user's target devices 120.

In block 1518, the routine 1500 obtains information regarding the market or markets for the user's target devices 120, such as information about the supply of and demand for a particular target device 120 at a given time. Electronic devices commonly lose value over time, although depending on supply and demand the price for an electronic device can also rise. For example, when a device is in the news or is in short supply (e.g., shortly before a new version is released), its market value may rise. On the other hand, after a device is replaced by a newer version, the market value of the device can be expected to fall. In some embodiments, the routine 1500 can identify a real or projected change in the price of the target device 120. In block 1520, the routine 1500 recommends target devices 120 for the user to recycle. For example, the app on the evaluator device 110 can display a message on the display 115 to alert the user that the value of a particular make and model of device may be expected to change or has changed significantly. The routine 1500 can also recommend recycling target device 120 based on, e.g., a promotion at a particular retailer such as an incentive to trade in the target device 120 for a newer device. The app can send the user a notification on the evaluator device 110, and/or a remote server can send the user an email or text message, to notify the user that the price of the user's target device 120 has risen or fallen or is expected to rise or fall, to inform the user that newer devices are expected and/or available, and/or to offer a coupon or special deal to the user, etc. By tracking the value of the user's target devices 120, the routine 1500 helps the user manage his or her portfolio of target devices 120. After block 1520, the routine 1500 ends.

The present technology allows devices of various types, such as mobile phones (smartphones and feature phones, for example), tablet computers, wearable computers, game devices, media players, laptop and desktop computers, etc. (e.g., the target device 120 440a-440n) to be evaluated by a software application on an evaluator device 110 to facilitate purchasing by an automated kiosk 300. The present technology enables the user to use the evaluator device 110 to obtain information about the target device 120 and/or the user, obtain a price quote for the target device 120, and manage a portfolio of the user's target devices 120 so that the user can sell the target device 120 (e.g., at the kiosk 300) with greater certainty and speed.

The present technology includes various other types and embodiments of recycling machines. For example, the present technology includes embodiments such as a countertop recycling station and/or a retail store-based interface operated by or with the assistance of a retail employee (such as a partially automated system). As another example, the present technology includes embodiments such as a recycling machine configured to accept all kinds of devices, including larger items (e.g., desktop and laptop computers, televisions, gaming consoles, DVRs, etc.).

The above Detailed Description of examples and embodiments of the invention is not intended to be exhaustive or to limit the invention to the precise form disclosed above. Although specific examples for the invention are described above for illustrative purposes, various equivalent modifications are possible within the scope of the invention, as those skilled in the relevant art will recognize.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

Although the above description describes various embodiments of the invention and the best mode contemplated, regardless how detailed the above text, the invention can be practiced in many ways. Details of the system may vary considerably in its specific implementation, while still being encompassed by the present technology. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. At least one non-transitory computer-readable memory carrying computer-executable instructions for causing a handheld first electronic device of a user, having at least one processor, to evaluate a second electronic device for recycling by a method comprising:
automatically detecting when the second electronic device is connected to the handheld first electronic device;
electronically sending, by the processor, a request from the handheld first electronic device to the second electronic device for information describing the second electronic device;
receiving, by the handheld first electronic device, in response to the request, the information describing the second electronic device from the second electronic;
associating a unique identifier with the second electronic device;
obtaining an image of the second electronic device via a camera of the handheld first electronic device;
transmitting the image, the unique identifier, and the information describing the second electronic device to a remote server;
receiving a price for the second electronic device from the remote server, wherein the price is based on the information describing the second electronic device and the image of the second electronic device; and
displaying the price to the user via the handheld first electronic device.

2. The computer-readable memory of claim 1 wherein the handheld first electronic device is a mobile phone.

3. The computer-readable memory of claim 1 wherein the handheld first electronic device is a tablet computer or laptop computer.

4. The computer-readable memory of claim 1 wherein the second electronic device is a used mobile telecommunication device.

5. The computer-readable memory of claim 1, wherein the method further comprises prompting the user to connect the handheld first electronic device to the second electronic device.

6. The computer-readable memory of claim 1 wherein the request from the handheld first electronic device to the second electronic device is sent via USB, Wi-Fi, or Bluetooth.

7. The computer-readable memory of claim 1 wherein electronically sending a request for information describing the second electronic device includes querying an operating system API of the handheld first electronic device for information from the second electronic device.

8. The computer-readable memory of claim 1 wherein electronically sending a request for information describing the second electronic device includes configuring the handheld first electronic device as a USB mass storage device containing an auto-run file, wherein the auto-run file includes instructions prompting the second electronic device to provide information describing the second electronic device to the handheld first electronic device.

9. The computer-readable memory of claim 1 wherein the request from the handheld first electronic device to the second electronic device is sent via USB, and wherein receiving the information describing the second electronic device includes receiving device class, vendor ID, and product ID information from the second electronic device.

10. The computer-readable memory of claim 1 wherein the request from the handheld first electronic device to the second electronic device is sent via Wi-Fi, Ethernet, or Bluetooth, and wherein receiving the information describing the second electronic device includes receiving MAC address information from the second electronic device.

11. The computer-readable memory of claim 1 wherein the request from the handheld first electronic device to the second electronic device is sent via Bluetooth, and wherein receiving the information describing the second electronic device includes receiving device name, device class, service, and MAC address information from the second electronic device.

12. The computer-readable memory of claim 1 wherein receiving the information describing the second electronic device includes receiving UPnP or DLNA Simple Service Discovery Protocol device description information from the second electronic device.

13. The computer-readable memory of claim 1 wherein receiving the information describing the second electronic device includes receiving HTTP or SIP User-Agent or UAProf address information from the second electronic device.

14. The computer-readable memory of claim 1 wherein receiving the information describing the second electronic device includes receiving the unique identifier from the second electronic device.

15. The computer-readable memory of claim 1 wherein receiving a price for the second electronic device includes accessing a lookup table or database stored on the handheld first electronic device.

16. The computer-readable memory of claim 1 wherein receiving a price for the second electronic device includes:
receiving, in response to the transmitting, pricing data for the second electronic device or an indication that the information is insufficient to determine a price for the second electronic device.

17. The computer-readable memory of claim 16 wherein transmitting the information describing the second electronic device to a remote server includes transmitting the information describing the second electronic device to a recycling kiosk.

18. The computer-readable memory of claim 1 wherein the information describing the second electronic device includes USB device class, vendor ID, and product ID information, and wherein receiving a price for the second electronic device includes receiving a price determined at least in part by querying a data structure that maps USB device class, vendor ID, or product ID information to pricing data about the second electronic device.

19. The computer-readable memory of claim 1 wherein the information describing the second electronic device includes MAC address information, and wherein receiving a price for the second electronic device includes receiving a price determined at least in part by querying a data structure that maps MAC address information to pricing data about the second electronic device.

20. The computer-readable memory of claim 1, wherein the method further comprises:
prompting the user to provide, via the handheld first electronic device, additional information about the second electronic device.

21. The computer-readable memory of claim 1, wherein the method further comprises:
prompting the user, via the handheld first electronic device, to bring the second electronic device to a recycling kiosk for evaluation.

22. The computer-readable memory of claim 1, wherein the method further comprises:
directing the user to photograph markings on the second electronic device using the camera of the handheld first electronic device;
receiving a photograph of the second electronic device; and
transmitting the photograph of the second electronic device to the remote server to determine the content of the markings on the second electronic device,
such that the receiving a price for the second electronic device includes receiving a price determined in part based on the content of the markings on the second electronic device.

23. The computer-readable memory of claim 1, wherein the method further comprises:
performing a visual inspection of the second electronic device using the camera of the handheld first electronic device; and
determining whether the condition of the second electronic device is acceptable, based on the visual inspection,
such that receiving a price for the second electronic device includes receiving a price determined in part based on the visual inspection.

24. The computer-readable memory of claim 1, wherein the method further comprises:
causing the second electronic device to display text or a visual pattern on a screen of the second electronic device;
receiving a photograph of the screen of the second electronic device displaying the text or visual pattern; and
transmitting the photograph of the screen of the second electronic device to the remote server to evaluate the condition of the second electronic device,
such that receiving a price for the second electronic device includes receiving a price determined in part based on the evaluation.

25. The computer-readable memory of claim 1, wherein the method further comprises identifying a model or hardware configuration of the second electronic device based on the information describing the second electronic device.

26. The computer-readable memory of claim 25 wherein identifying a model or hardware configuration of the second electronic device based on the information describing the second electronic device comprises accessing a database or lookup table on the handheld first electronic device.

27. The computer-readable memory of claim 25 wherein identifying a model or hardware configuration of the second electronic device based on the information describing the second electronic device includes:
receiving, by the handheld first electronic device, in response to the transmitting, an identification of the second electronic device from the remote server.

28. The computer-readable memory of claim 25, wherein receiving a price for the second electronic device includes receiving a price determined based in part on the identifying of a model or hardware configuration of the second electronic device.

29. The computer-readable memory of claim 1, wherein the method further comprises causing the identification of a model or hardware configuration of the second electronic device to be presented to the user via the handheld first electronic device.

30. The computer-readable memory of claim 1, wherein the method further comprises recording the price, such that the user can recycle the second electronic device for the price.

31. At least one non-transitory computer-readable memory carrying computer-executable instructions for causing one or more processors to facilitate purchasing an electronic device at a consumer-operated kiosk, the computer-executable instructions comprising instructions that, when executed by a processor of a handheld first electronic device of a user, cause the handheld first electronic device to:
receive a user request to price a second electronic device;
automatically detect when the second electronic device is connected to the handheld first electronic device, wherein the second electronic device is connected to the handheld first electronic device via a communication link;
electronically send a request for information about the second electronic device to the second electronic device via the communication link;
receive characteristic information about the second electronic device from the second electronic device via the communication link;
associate a unique identifier with the second electronic device;
direct the user to obtain an image of the second electronic device via a camera of the handheld first electronic device;
transmit the characteristic information, the unique identifier, and the image to a remote server;
receive a price for the second electronic device from the remote server, wherein the price is based at least in part on the characteristic information and the image of the second electronic device; and
present the price to a user of the handheld first electronic device.

32. The non-transitory computer-readable memory of claim 31 wherein the handheld first electronic device is a mobile device.

33. The non-transitory computer-readable memory of claim 31 wherein the handheld first electronic device is a tablet computer or laptop computer.

34. The non-transitory computer-readable memory of claim 31 wherein the second electronic device is a handheld device.

35. The non-transitory computer-readable memory of claim 31, further comprising instructions that, when executed by a processor of the kiosk, cause the kiosk to:
identify the price presented to the user of the handheld first electronic device; and
offer to purchase the second electronic device for the price.

36. The non-transitory computer-readable memory of claim 31, further comprising:
instructions that, when executed by a processor of the kiosk, cause the kiosk to:
receive the unique identifier associated with the second electronic device;

identify the second electronic device and the price based on the unique identifier; and offer to purchase the second electronic device for the price.

37. The non-transitory computer-readable memory of claim 31 wherein the second electronic device is connected to the handheld first electronic device via a wireless communication link.

38. The non-transitory computer-readable memory of claim 31, further comprising instructions that, when executed by the processor of the handheld first electronic device, cause the handheld first electronic device to:

electrically query the remote server using the characteristic information about the second electronic device; and receive an identification of the second electronic device in response to the query.

39. The non-transitory computer-readable memory of claim 31 wherein receiving characteristic information about the second electronic device includes receiving information identifying a make, model or hardware configuration of the second electronic device.

40. The non-transitory computer-readable memory of claim 31:

wherein receiving characteristic information about the second electronic device includes obtaining a hardware address of the second electronic device; and further comprising instructions that, when executed by the processor of the handheld first electronic device, cause the handheld first electronic device to parse the hardware address of the second electronic device to determine a make or model of the second electronic device.

41. The non-transitory computer-readable memory of claim 31, further comprising instructions that, when executed by a processor of the remote server, cause the remote server to:

the image of the second electronic device to identify features of the second electronic device;

evaluate the condition of the second electronic device based on the identified features; and determine the price for the second electronic device factoring in the evaluation of the condition of the second electronic device.

42. The non-transitory computer-readable memory of claim 31 wherein receiving a price for the second electronic device includes:

receiving, by the handheld first electronic device, a data structure containing device pricing data;

determining whether the data structure contains sufficient pricing data applicable to the second electronic device; and obtaining the pricing data applicable to the second electronic device from the data structure.

43. The non-transitory computer-readable memory of claim 31 wherein receiving a price for the second electronic device includes receiving a price that is determined contingent on a visual analysis of the second electronic device at the kiosk.

* * * * *